(12) United States Patent
Frenger et al.

(10) Patent No.: US 11,916,623 B2
(45) Date of Patent: Feb. 27, 2024

(54) METHODS AND APPARATUSES FOR CELL-FREE MASSIVE MIMO COMMUNICATION

(71) Applicant: Telefonaktiebolaget LM Ericsson (publ), Stockholm (SE)

(72) Inventors: Pål Frenger, Linköping (SE); Erik G. Larsson, Linköping (SE); Giovanni Interdonato, Linköping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 387 days.

(21) Appl. No.: 17/283,582

(22) PCT Filed: Nov. 6, 2018

(86) PCT No.: PCT/SE2018/051131
§ 371 (c)(1),
(2) Date: Apr. 8, 2021

(87) PCT Pub. No.: WO2020/076203
PCT Pub. Date: Apr. 16, 2020

(65) Prior Publication Data
US 2021/0344389 A1    Nov. 4, 2021

Related U.S. Application Data

(60) Provisional application No. 62/744,680, filed on Oct. 12, 2018.

(51) Int. Cl.
*H04B 7/0452*    (2017.01)
*H04L 5/00*    (2006.01)
(Continued)

(52) U.S. Cl.
CPC ......... *H04B 7/0452* (2013.01); *H04L 5/0048* (2013.01); *H04L 25/021* (2013.01);
(Continued)

(58) Field of Classification Search
CPC .... H04B 7/0452; H04B 7/024; H04B 7/0413; H04B 7/04; H04L 5/0048; H04L 25/021;
(Continued)

(56) References Cited

U.S. PATENT DOCUMENTS 9,918,317 B2 *  3/2018  Nayebi .................. H04B 7/024
2015/0365953 A1 * 12/2015  Papadopoulos ........ H04B 7/024
370/329

(Continued)

FOREIGN PATENT DOCUMENTS

EP    3021619 A1    5/2016
EP    3160194 A1    4/2017
(Continued)

OTHER PUBLICATIONS

"Cell-Free Massive MIMO: Uniformly Great Service For Everyone"; Ngo et al.; 2015 IEEE 16th International Workshop on Signal Processing Advances in Wireless Communications (SPAWC); Jun. 28, 2015 (Year: 2015).*

(Continued)

*Primary Examiner* — Benjamin H Elliott, IV
(74) *Attorney, Agent, or Firm* — Christopher & Weisberg, P.A.

(57) ABSTRACT

The present disclosure relates in general to telecommunications. In one of its aspects, the technology presented herein concerns a method, implemented in an Access Point (AP), for transmitting data intended for a terminal in a cell-free massive Multiple-Input and Multiple-Output (MIMO) communications system. The AP is grouped into a cluster together with other APs and the cluster operates autonomously. The cluster is connected to, and managed by, one Central Processing Unit (CPU). A message that the AP is selected to serve the terminal and data intended for said terminal are received from the CPU. Power control is (Continued)

independently conducted, exclusively considering the terminals that are served by the AP itself. Thereafter, said intended data is transmitted to the terminal.

16 Claims, 17 Drawing Sheets

(51) Int. Cl.
  *H04L 25/02* (2006.01)
  *H04W 52/34* (2009.01)
  *H04W 88/08* (2009.01)

(52) U.S. Cl.
  CPC ......... *H04L 25/0228* (2013.01); *H04W 52/34* (2013.01); *H04W 88/08* (2013.01)

(58) Field of Classification Search
  CPC .. H04L 25/0228; H04W 52/34; H04W 88/08; H04W 52/42; H04W 52/146; H04W 52/346; H04W 52/14
  See application file for complete search history.

(56) References Cited

U.S. PATENT DOCUMENTS

| | | | | |
|---|---|---|---|---|
| 2016/0065257 | A1* | 3/2016 | Fujii | H04L 1/0003 375/267 |
| 2016/0134438 | A1* | 5/2016 | Marzetta | H04L 25/0228 370/315 |
| 2016/0197658 | A1* | 7/2016 | Jindal | H04L 25/03898 375/267 |
| 2018/0014305 | A1* | 1/2018 | Nayebi | H04B 7/0456 |
| 2018/0132118 | A1* | 5/2018 | Nekovee | H04W 28/0247 |
| 2018/0146491 | A1* | 5/2018 | Kim | H04W 24/10 |
| 2018/0213486 | A1* | 7/2018 | Yoo | H04W 52/241 |
| 2018/0263043 | A1* | 9/2018 | Zhou | H04B 7/024 |
| 2019/0074876 | A1* | 3/2019 | Kakishima | H04L 5/005 |
| 2020/0037260 | A1* | 1/2020 | Fu | H04W 52/146 |
| 2020/0119772 | A1* | 4/2020 | Interdonato | H04B 7/0452 |
| 2021/0136697 | A1* | 5/2021 | Fu | H04W 80/08 |
| 2021/0289451 | A1* | 9/2021 | Fu | H04W 72/23 |
| 2021/0344389 | A1* | 11/2021 | Frenger | H04W 52/34 |

FOREIGN PATENT DOCUMENTS

| | | |
|---|---|---|
| WO | 2017044155 A1 | 3/2017 |
| WO | 2017126517 A1 | 7/2017 |

OTHER PUBLICATIONS

"Energy Efficiency Optimization for Cell-Free Massive MIMO"; Ngo et al.; 2017 IEEE 18th International Workshop on Signal Processing Advances in Wireless Communications (SPAWC); Jul. 3, 2017 (Year: 2017).*

"On the Performance of Cell-Free Massive MIMO with Short-Term Power Constraints"; Interdontao et al.; 2016 IEEE 21st International Workshop on Computer Aided Modelling and Design of Communication Links and Networks (CAMAD); Oct. 23, 2015 (Year: 2015).*

International Search Report and Written Opinion dated Jul. 10, 2019 for International Application No. PCT/ SE2018/051131 filed on Nov. 6, 2018, consisting of 12—pages.

Giovanni Interdonato et al.; How Much Do Downlink Pilots Improve Cell-Free Massive MIMO ?; IEEE Global Communications Conference; Sep. 13, 2016, consisting of 7—pages.

Hien Quoc Ngo et al.; Cell-Free Massive MIMO versus Small Cells; IEEE Transactions On Wireless Communications, vol. 16; Mar. 3, 2017, consisting of 18—pages.

EPO Communication and Supplementary European Search Report dated Jun. 2, 2022 for Patent Application No. 18936632.1, consisting of 7—pages.

* cited by examiner

METHODS AND APPARATUSES FOR CELL-FREE MASSIVE MIMO COMMUNICATION

CROSS-REFERENCE TO RELATED APPLICATIONS

This application is a Submission Under 35 U.S.C. § 371 for U.S. National Stage Patent Application of International Application No.: PCT/SE2018/051131, filed Nov. 6, 2018 entitled "METHODS AND APPARATUSES FOR CELL-FREE MASSIVE MIMO COMMUNICATION," which claims priority to U.S. Provisional Application No. 62/744,680, filed Oct. 12, 2018, the entireties of both of which are incorporated herein by reference.

TECHNICAL FIELD

The present disclosure generally relates to telecommunications. In particular, the various embodiments described in this disclosure relates to Access Points, Central Processing Units, communications systems and methods for transmitting data. Computer programs and carriers containing computer programs are also provided herein. Particular embodiments relate to transmitting data intended for a terminal in a cell-free massive Multiple-Input and Multiple-Output, MIMO, communications system.

BACKGROUND

This section is intended to provide a background to the various embodiments of the invention that are described in this disclosure. Therefore, unless otherwise indicated herein, what is described in this section should not be interpreted to be prior art by its mere inclusion in this section.
Cell-Free Massive Multiple-Input and Multiple-Output (MIMO)

In cell-free massive Multiple-Input and Multiple-Output (MIMO), Access Points (APs) are spread out geographically, as illustrated in FIG. 1. In the canonical case, all APs serve all users, e.g. terminals or User Equipment (UE), through coherent beamforming. Maximum-ratio (conjugate beamforming) has been especially advocated in the literature due to its simple and distributed processing.

Power control is important in cell-free massive MIMO. The power spent by AP m, m=1, ..., M, on the service of terminal k, k=1, ..., K is parameterized in terms of a power control coefficient $\eta_{mk}$, where $0 \leq \eta_{mk} \leq 1$. This is further described by H. Q. Ngo, A. Ashikhmin, H. Yang, E. G. Larsson and T. L. Marzetta, in "Cell-free massive MIMO versus small cells," IEEE Transactions on Wireless Communications, vol. 16, pp. 1834-1850, March 2017.

The data signal sent by the mth AP is $$x_m = \sqrt{\rho_d} \Sigma_{k=1}^{K} \sqrt{\eta_{mk}} \hat{g}_{mk}^* q_k, \quad (1)$$

where $q_k$ is the unit-power data symbol, intended for the kth terminal, and $\rho_d$ is the normalized transmit Signal-to-Noise Ratio (SNR) related to the data symbol, that is the radiated power over the power of the noise figure. The term $\hat{g}_{mk}^*$ represents the precoding factor. Each AP has a transmission power constraint related to $\rho_d$, i.e. the per-access point power constraint is:

$$\mathbb{E}\{|x_m|^2\} \leq \rho_d \text{ for all } m \quad (2)$$

which can be expressed as, $$\Sigma_k \eta_{mk} \gamma_{mk} \leq 1 \text{ for all } m \quad (3)$$

where $\gamma_{mk}$ is the variance of the estimated channel between AP m and terminal k. For given power control coefficients, analytical capacity lower bounds ("achievable rates") exist that quantify performance given some pre-determined path-loss and fading model. The power control coefficients are functions only of the long-term channel statistics and need to be computed centrally. Algorithms for an optimal selection of $\eta_{mk}$ are available. Specifically, max-min fairness power control, that ensures that every terminal in the network obtains the same quality of service (rate), is possible through the use of convex optimization tools. However, this may be computationally very demanding. Max-min fairness power control has been popular in many academic papers, but simpler effective policies are also known, see e.g. U.S. Pat. No. 9,918,317 (B2), by Nayebi et al.

Radio Stripes

Recently, a principle of "radio stripes" was introduced. The actual "base stations" in a "radio stripe system" may comprise circuit mounted chips inside a protective casing of a cable or a stripe. The receive and transmit processing of each antenna element may be performed next to the actual antenna element itself. Since the total number of distributed antenna elements is assumed to be large (e.g. several hundreds) the radio frequency transmit power of each antenna element is very low.

FIG. 2 illustrates an example embodiment of a massive MIMO radio stripe system and may exemplify how the actual distributed massive MIMO base station could be built. A Central Processing Unit (CPU), or stripe station, connects with one or more radio stripes, or distributed MIMO active antenna cables.

The actual radio stripes may comprise tape or adhesive glue on the backside, as in the example of the LED stripes, or it may simply comprise very small per-antenna processing units and antennas protected by the plastics covering the cable.

Radio stripe system deployments may e.g. be used to provide good coverage in factory buildings. This is schematically depicted in FIG. 3, which illustrates a deployment example of how a distributed massive MIMO system may be used indoor in a building, e.g. factory. The antennas used to serve the terminal, e.g. exemplified as a user terminal, in this example are marked with solid lines, and is accordingly the six antennas surrounding the terminal.

Other suitable scenarios for radio stripe deployments are e.g. in stadiums, trains, public squares, trains, busses, etc.

SUMMARY

It is in view of the above background and other considerations that the various embodiments of the present disclosure have been made.

There currently exist certain challenges with existing solutions. Scalability problem The notion that the "whole world" would constitute one large network of distributed APs, and that data from all APs would be processed coherently, is not scalable. There are at least three different problems, at least some of which are addressed herein.

1. Data destined for every terminal in the network would have to be sent to every AP. This may render the computational complexity at each AP unsustainable.
2. The complexity of the interconnect at the central unit, or Central Processing Unit, CPU, does not scale as the central unit may need one connection to each AP in the network.

3. The calculation of the power control coefficients does not scale, even taking computational issues aside. Specifically, the power control coefficient associated with some terminal k and some access point m may depend on the channel statistics of terminal-access point pairs very far away. This "butterfly effect" entangles the power control coefficients across the whole network.

There are two suggested approaches that seem to have attempted, but failed, to address the scalability problem. These two suggested approaches are the following:

a) "User-centric" transmission. The idea is that for each terminal, only a small number of APs should participate in the service of that terminal. Effectively each terminal may be served by a "cluster" of near-by APs. FIG. 4 shows an example of user-centric transmission. The encircled AP constitute a cluster for a specific terminal. The user-centric transmission may be viewed as a special case of the common cell-free massive MIMO setup where all power control coefficients $\eta_{mk}$ of a given terminal k are constrained to be zero, except for those associated with the closest APs. However, this concept may not solve problem 2 described above: i.e. that all APs may need to be connected to a central unit, or CPU.

b) Separate clusters of APs, where each cluster is served by one central unit, or CPU. FIG. 5 shows an example with separate clusters of APs.

The APs connected to a given central unit will form a cluster. These clusters will either mutually interfere, or they will have to cooperate through coherent transmission, which brings back the scalability problem.

The following example may, with reference to FIGS. 6a and 6b, illustrate the inter-cluster interference problem in more detail. In the example, a standard cell-free massive MIMO simulation was performed. Instead of wrap-around, a simple embedding technique was used to substantially eliminate border effects: A square A of 2.5 km×2.5 km was considered. In the middle of A, a focus square B of 1 km×1 km was defined. For transmission, all nodes in A were considered, but only the nodes inside of B were considered for the performance evaluation. The effect is substantially that nodes inside of B are samples of a "stationary" distribution, not affected by edge effects; and that edge effects affect only terminals at the boundary of A.

In the example, 625 APs and 125 terminals were uniformly at random placed in A, such that 100 APs and 20 terminals fell into B, and the remaining 525+105 "dummy" nodes into the area that falls between A and B.

Pilots were assigned at random, and clearly, there is potential for improvement in this respect. In FIGS. 6a and 6b, x=AP, and o=terminal. In FIG. 6a, all APs are connected to a single central unit, CPU. In FIG. 6b, groups of APs are connected to separate central units, CPUs. There is no coherent cooperation, or cooperation on power control, between the central units, CPUs, although the central units, CPUs, are still connected together in order to distribute the payload. This system hence is scalable.

The problem with the solution depicted in FIG. 6b is the rather poor performance. In the following example, illustrated in FIG. 7, power control is applied with $$\eta_{mk} = \frac{\frac{1}{\sqrt{\gamma_{mk}}}}{\sum_{k'} \sqrt{\gamma_{mk'}}} \quad (4)$$

where the sum over k' is over terminals that are served by the m APs. The normalization in the denominator is important because it ensures that the per AP power-constraint (3), i.e. $\Sigma_k \eta_{mk} \gamma_{mk} \leq 1$ for all m, is satisfied. This power control policy is not optimal, but it is very simple and it ensures that the effective power allocated to the service of terminal k by AP m is proportional to $\gamma_{mk}\eta_{mk} \propto \sqrt{\gamma_{mk}}$; the better channel between an AP and a terminal, the more power is allocated by the AP to the service of that terminal. Note that these power control coefficients can be computed by each AP independently. The performance is illustrated in FIG. 7. As illustrated in the figure, these solutions, or approaches, are either non-scalable (solid line) or they have poor performance (dashed line).

In Cell-free Massive MIMO, it is generally assumed that each terminal is connected to all the APs, within a very wide area. This wide area is in turn managed by a single CPU. Although Channel State Information, CSI, acquisition and precoding may be performed locally at each AP, data and power control strategies need to pass through the CPU. There have to be a link between each AP and the CPU. This system is not scalable as the number of APs and terminals grows large, and it is centralized concerning data exchange and calculation of power control coefficients.

In view of the above, it is therefore a general object of the aspects and embodiments described throughout this disclosure to provide a solution for scalable cell-free massive MIMO.

Certain aspects of the present disclosure and their embodiments may provide solutions to these or other challenges.

The general object has been addressed by the appended independent claims. Advantageous embodiments are defined in the appended dependent claims.

According to a first aspect, there is provided a method, implemented in an Access Point (AP) for transmitting data intended for a terminal in a cell-free massive Multiple-Input and Multiple-Output (MIMO) communications system.

The AP is grouped into a cluster together with other APs and the cluster operates autonomously. The cluster is connected to, and managed by, one Central Processing Unit (CPU). The method comprises receiving, from the CPU, a message that the AP is selected to serve the terminal and data intended for said terminal. The method further comprises: independently conducting power control, exclusively considering the terminals that are served by the AP itself; and transmitting said intended data to the terminal.

In one embodiment, an uplink pilot is received from the terminal; and uplink channel condition is estimated from said uplink pilot.

In one embodiment, it is determined, based on a metric related to a relation between the AP and the terminal, that the AP can serve the terminal. Thereafter, a message is transmitted to the CPU that the AP can serve the terminal. The metric may for example be channel condition and it is determined that the AP can serve the terminal based on the channel condition estimated by the AP from uplink pilots received from the terminal.

In one embodiment, conducting power control comprises calculating a power control coefficient ($\eta$) for use with the terminal. The power control coefficient ($\eta$) is calculated by a normalized function $f(\cdot)$ of at least one parameter of the communications system. The function $f(\cdot)$ is normalized to ensure that a power constraint of the AP is fulfilled. The normalized function $f(\cdot)$ may for example be a function $f(\cdot)$ of one or more local parameters of the communications system. According to one example, the function $f(\bullet)$ is a function $f(\bullet)$ of variance of an estimated channel ($\gamma$) between the AP (200) and the terminal. According to another example, function $f(\bullet)$ is a function $f(\bullet)$ of variances of estimated channels ($\gamma$) between the AP and at least a subset of terminals served by the AP.

According to a second aspect, there is provided an Access Point (AP) configured to perform the method according to the first aspect.

The AP is configured to transmit data intended for a terminal in a cell-free massive Multiple-Input and Multiple-Output (MIMO) communications system. The AP is grouped into a cluster together with other APs and the cluster operates autonomously. The cluster is connected to, and managed by, one Central Processing Unit, CPU. The AP comprises a processing circuitry and a memory circuitry. The memory circuitry stores computer program code which, when run in the processing circuitry, causes the AP to receive, from the CPU, a message that the AP is selected to serve the terminal and data intended for said terminal. The AP is caused to independently conduct power control, exclusively considering the terminals that are served by the AP itself; and to transmit said intended data to the terminal.

In one embodiment, the AP's memory circuitry stores computer program code which, when run in the processing circuitry, causes the AP to receive an uplink pilot from the terminal; and to estimate uplink channel condition from said uplink pilot.

In one embodiment, the AP's memory circuitry stores computer program code which, when run in the processing circuitry, causes the AP to determine, based on a metric related to a relation between the AP and the terminal, that the AP can serve the terminal. The AP is further caused to transmit a message to the CPU that the AP can serve the terminal. The metric may for example be a channel condition, and the memory circuitry may store computer program code which, when run in the processing circuitry, causes the AP to determine that the AP can serve the terminal based on the channel condition estimated by the AP from uplink pilots received from the terminal.

In one embodiment, the AP's memory circuitry stores computer program code which, when run in the processing circuitry, causes the AP to conduct power control by calculate a power control coefficient ($\eta$) for use with the terminal. The power control coefficient ($\eta$) is calculated by a normalized function $f(\bullet)$ of at least one parameter of the communications system. The function $f(\bullet)$ is normalized to ensure that a power constraint of the AP is fulfilled. The normalized function $f(\bullet)$ may for example be a function $f(\bullet)$ of one or more local parameters of the communications system. According to one example embodiment, the function $f(\bullet)$ is a function $f(\bullet)$ of variance of an estimated channel ($\gamma$) between the AP and the terminal. According to another example, the function $f(\bullet)$ is a function $f(\bullet)$ of variances of estimated channels ($\gamma$) between the AP and at least a subset of terminals served by the AP.

According to a third aspect, there is provided a method, implemented in a Central Processing Unit (CPU) for transmitting data intended for a terminal in a cell-free massive Multiple-Input and Multiple-Output (MIMO) communications system.

The CPU is connected to, and manages, a cluster of Access Points (Aps) and the cluster operates autonomously. The method comprises transmitting, to all APs in the cluster, a message that the receiving APs are selected to serve the terminal and said data intended for the terminal.

In one embodiment, a message is received, from an AP within the cluster, that said AP can serve the terminal; and all APs in the cluster that the CPU manages are identified.

According to a fourth aspect, a Central Processing Unit (CPU) is provided.

The CPU is configured to transmit data intended for a terminal in a cell-free massive Multiple-Input and Multiple-Output (MIMO) communications system. The CPU is connected to, and manages, a cluster of Access Points (APs) and the cluster operates autonomously. The CPU comprises a processing circuitry and a memory circuitry. The memory circuitry stores computer program code which, when run in the processing circuitry, causes the CPU to transmit, to all APs in the cluster, a message that the receiving APs are selected to serve the terminal and said data intended for the terminal.

In one embodiment, the CPU's memory circuitry stores computer program code which, when run in the processing circuitry, causes the CPU to receive, from an AP within the cluster, a message that said AP can serve the terminal; and to identify all APs in the cluster that the CPU manages.

According to a fifth aspect, there is provided a cell-free massive Multiple-Input and Multiple-Output (MIMO) communications system for transmitting data to a terminal.

The MIMO communications system comprises multiple Central Processing Units (CPUs) according to the fourth aspect. Each CPU is interconnected with the other CPUs. The MIMO communications system further comprises multiple Access Points (APs) according to the second aspect. The APs are grouped into clusters which operate autonomously. Each cluster is connected to, and managed by, one CPU respectively.

According to a sixth aspect, there is provided a computer program, comprising instructions which, when executed on a processing circuitry, cause the processing circuitry to carry out the method according to the first aspect and/or the third aspect.

According to a seventh aspect, there is provided a carrier containing the computer program of the sixth aspect, wherein the carrier is one of an electronic signal, optical signal, radio signal, or computer readable storage medium.

Thus, in this disclosure, a distributed and scalable user-centric architecture for Cell-free Massive MIMO, i.e., distributed Massive MIMO with joint coherent transmission, is provided. The APs may be grouped in clusters. Each cluster may be managed by a CPU and may operate autonomously. Accordingly, there may be pre-determined clusters of APs, wherein each cluster being connected to one central unit, i.e. one CPU.

A user-specific subset of APs may be designed to serve a given terminal, i.e. user-centric design. This subset may be determined based on a proper metric. For example, a possible metric may be the path loss estimated by the access points from uplink reference signals, e.g. uplink pilots, sent by the terminal. Another possible metric may be distance and the subset of APs may comprise the APs closest to said terminal.

The terminal may then be served by all the AP clusters involved in the user-specific AP subset. The data intended to terminal k may only be distributed among the CPUs of the clusters selected. Each terminal that is scheduled to receive service may be associated with at least one of these AP clusters, and the corresponding central units, CPUs.

The payload data destined to a given terminal may be distributed to those central units, CPUs, that serve the clusters that the terminal has been associated with.

The power control coefficients may then be computed locally at each AP in an autonomous fashion. The power control coefficients may be computed independently by each AP. Clusters that do not participate in the service of a given terminal may be assigned a power control coefficient of zero for that terminal. In clusters that serve a given terminal, power control coefficients may be computed via a formula.

There are, proposed herein, various embodiments which address one or more of the issues disclosed herein.

BRIEF DESCRIPTION OF THE DRAWINGS

Various aspects of the present invention will now be described, by way of example, based on embodiments with reference to the accompanying drawings, wherein.

DETAILED DESCRIPTION

Some of the embodiments contemplated herein will now be described more fully hereinafter with reference to the accompanying drawings. Other embodiments, however, are contained within the scope of this disclosure and the invention should not be construed as limited to only the embodiments set forth herein; rather, these embodiments are provided by way of example to convey the scope of the inventive concept to those skilled in the art. Like numbers refer to like elements throughout the description.

In a first of its aspects, the disclosure presented herein concerns a method for transmitting data intended for a terminal in a cell-free massive Multiple-Input and Multiple-Output (MIMO) communications system.

Figure 1:
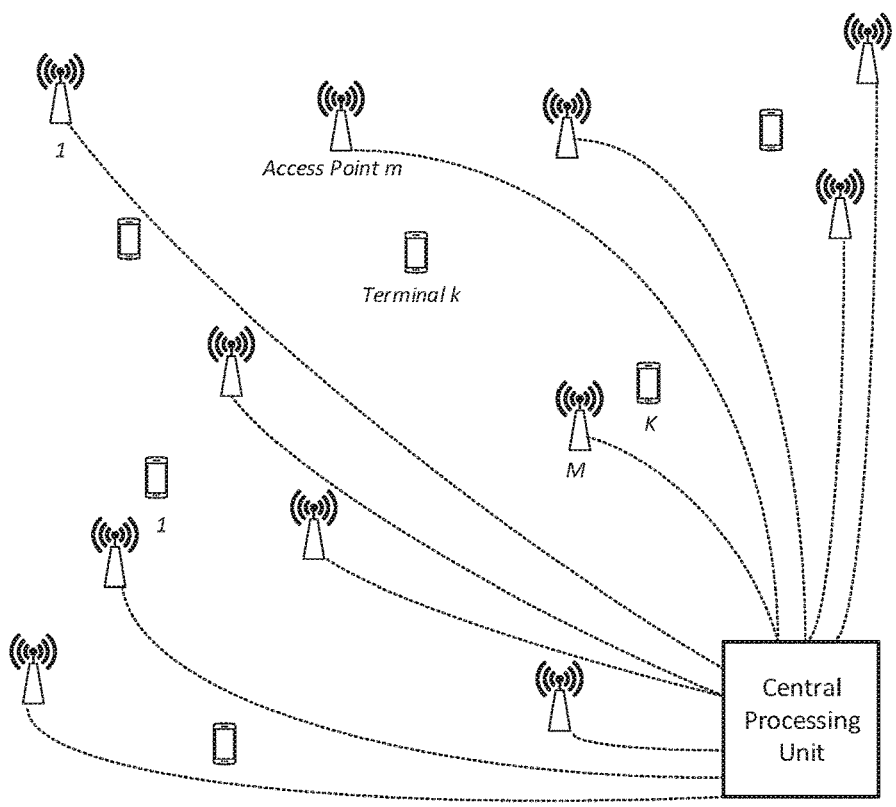
FIG. 1 illustrates an example cell-free massive MIMO.
Figure 2:
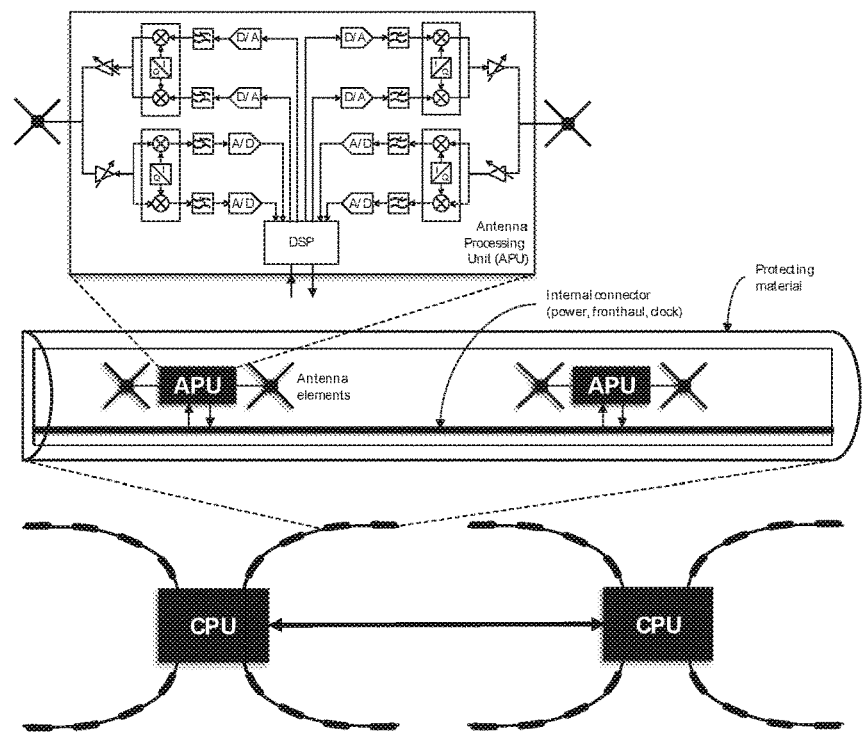
FIG. 2 illustrates an example embodiment of a massive MIMO radio stripe system.
Figure 3:
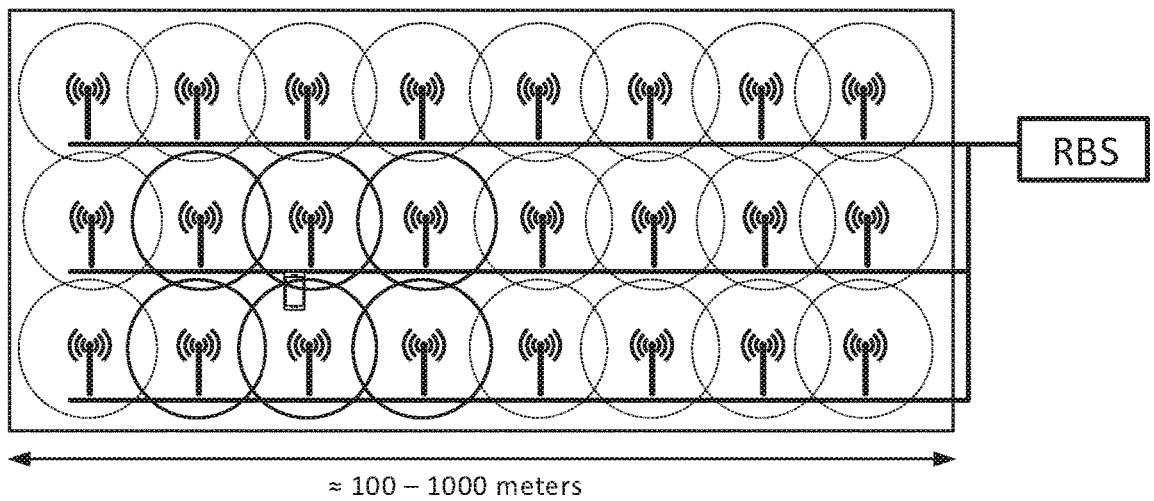
FIG. 3 shows an example of how a distributed massive MIMO system may be used indoor in a building.
Figure 4:
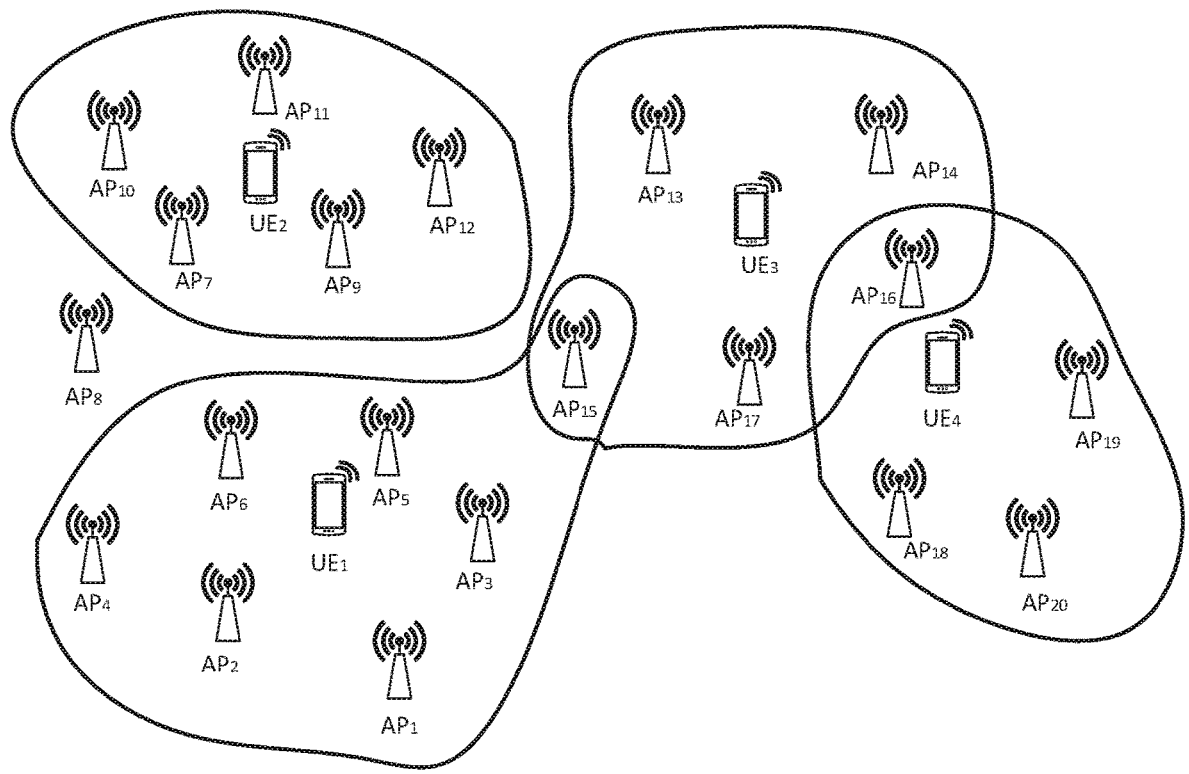
FIG. 4 shows an example of user-centric transmission.
Figure 5:
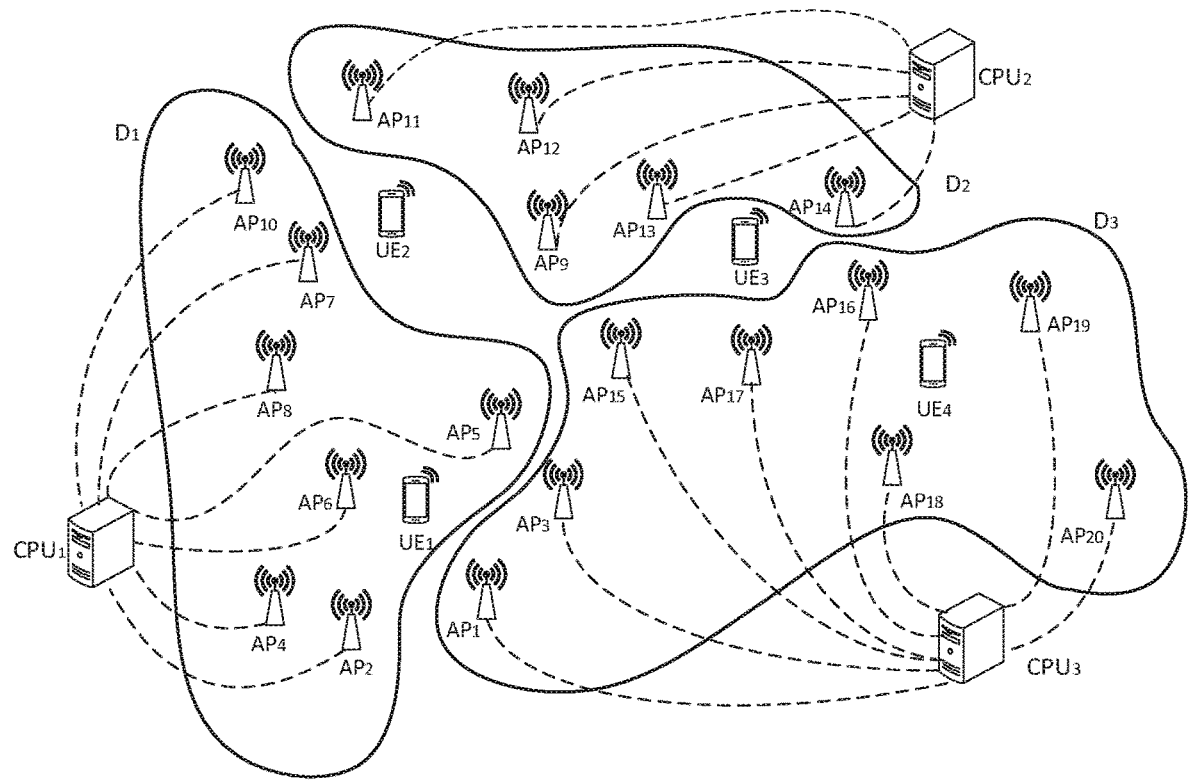
FIG. 5 shows an example with separate clusters of APs.
Figure 6A:
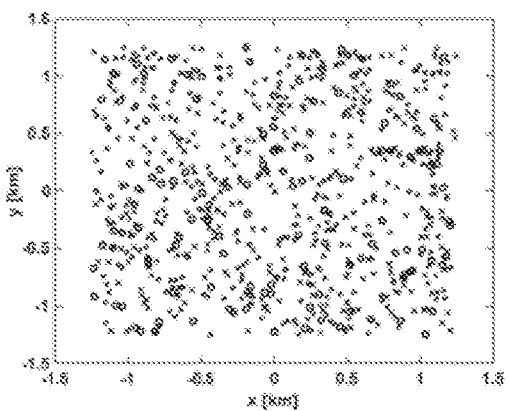
FIG. 6a illustrates an example depicting inter-cluster interference, when all APs are connected to a single CPU.
Figure 6B:
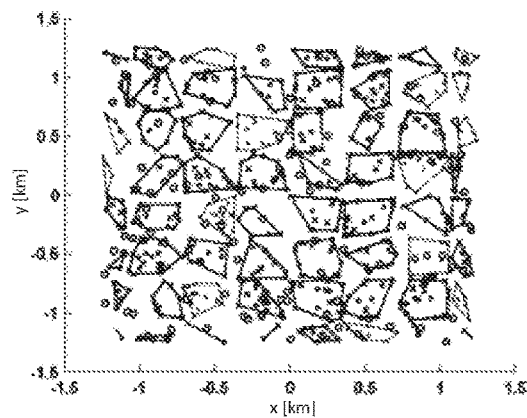
FIG. 6b illustrates an example depicting inter-cluster interference, when groups of APs are connected to separate CPUs.
Figure 7:
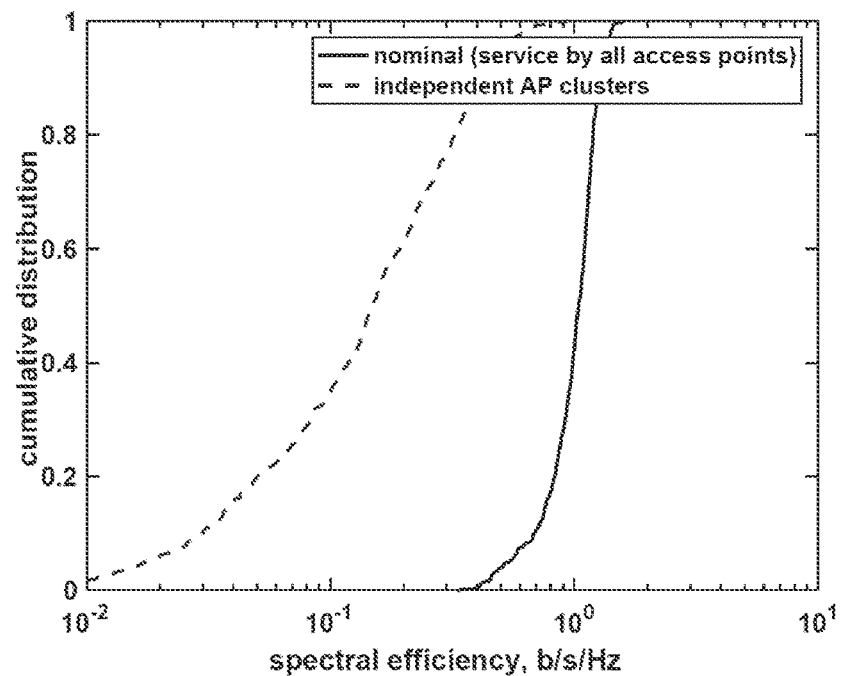
FIG. 7 shows performance of the approaches illustrated in FIGS. 6a and 6b.
Figure 8:
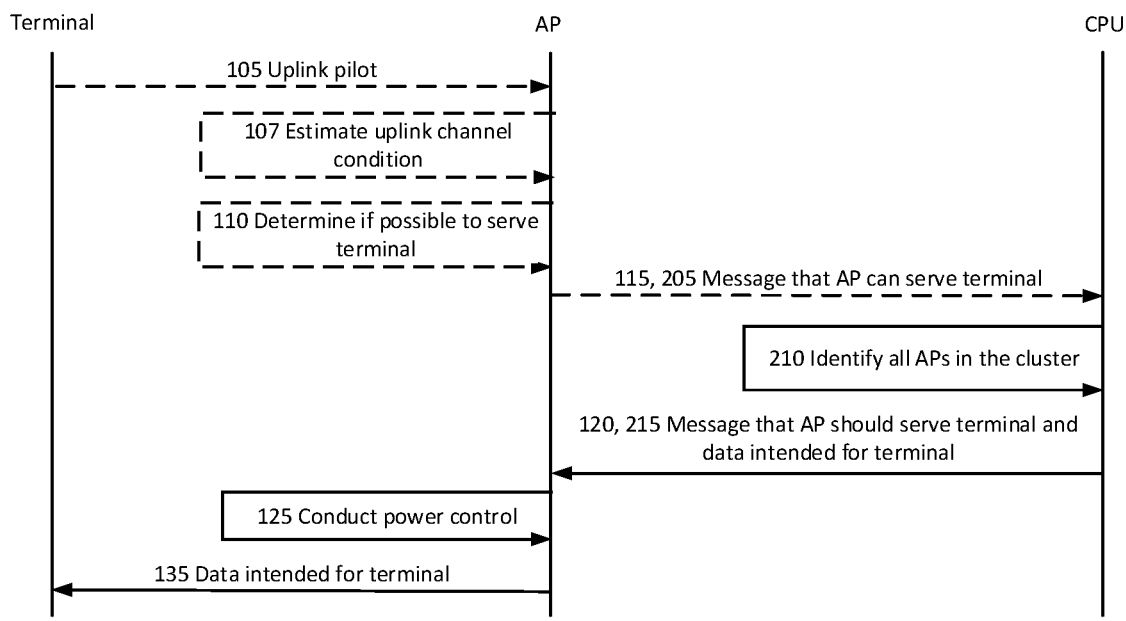
FIG. 8 illustrates an example message sequence chart of a process for transmitting data intended for a terminal.
Figure 9:
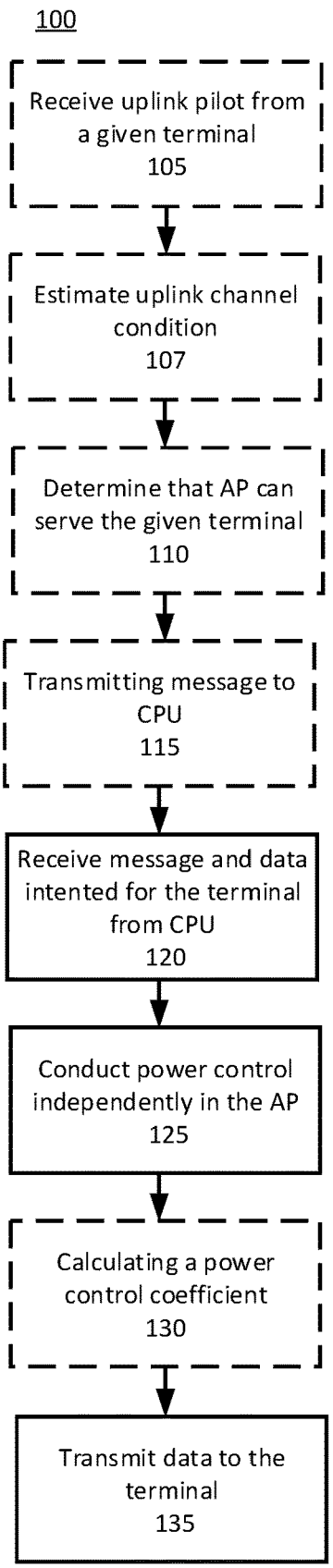
FIG. 9 is a flowchart illustrating example embodiments of method steps.

With reference to FIGS. 8 and 9, a first embodiment will now be described. FIG. 8 illustrates a message sequence chart of a process for transmitting data intended for a terminal in a cell-free massive MIMO communications system, illustrating which messages and information that is sent between different entities in the cell-free massive MIMO communications system. FIG. 9 illustrates a method 100, implemented by an Access Point (AP), for transmitting data intended for a terminal in a cell-free massive MIMO communications system.

The APs may be grouped into a cluster together with other APs. The cluster may operate autonomously. The cluster may be connected to, and managed by, one Central Processing Unit, CPU. The method may start in that a message that the AP is selected to serve the terminal and data intended for said terminal is received 120 from the CPU. Power control may be independently conducted 125, exclusively considering the terminals that are served by the AP itself. Thereafter, said intended data may be transmitted 135 to the terminal.

According to this embodiment, the number of terminals that the AP may serve is reduced. The AP may only need to serve the terminals for which is has been selected. This may reduce the computational complexity at the AP when it comes to calculating the power control coefficients, but also when it comes to estimating the channel, to defining the precoder and to decoding and forwarding data in uplink and downlink.

Some further embodiments will now be described with reference to FIG. 9. In one exemplary embodiment, the method may further comprise receiving 105 an uplink pilot from the terminal, and estimating 107 uplink channel condition from said uplink pilot. The uplink channel condition, or Channel State Information (CSI) may be for example channel gain.

In one embodiment, the method may further comprise determining 110, based on a metric related to a relation between the AP and the terminal, that the AP can serve the terminal. Thereafter, the method may further comprise transmitting 115 a message to the CPU that the AP can serve the terminal. The metric may for example be a channel condition, and determining 110 that the AP can serve the terminal may be based on the channel condition estimated by the AP from uplink pilots received from the terminal. The channel condition may comprise information about the condition of the channel between the AP and the terminal and may be, for example, CSI. The channel condition may be, for example, channel gain, path loss, shadowing etc.

In one embodiment, conducting 125 power control may comprise calculating 130 a power control coefficient (η) for use with the terminal. The power control coefficient (η) may be calculated by a normalized function f(•) of at least one parameter of the communication system. The function f(•) may be normalized to ensure that a power constraint of the AP's is fulfilled.

As the AP independently conducting 125 power control, exclusively considering the terminals that are served by the AP itself, a given AP m may only involve local parameters and accordingly the power control coefficient (η) may be expressed as being calculated by the function $f_m(•)$. The normalized function f(•) may thus, according to one embodiment, be a function f(•) of one or more local parameters of the communication system.

In one embodiment, the function f(•) may be a function f(•) of variance of an estimated channel (γ) between the AP and the terminal. According to another embodiment, the function f(•) may be a function f(•) of variances of estimated channels (γ) between the AP and at least a subset of terminals served by the AP.

According to a second aspect, there is provided an AP for implementing the method according to the first aspect.

Figure 10:
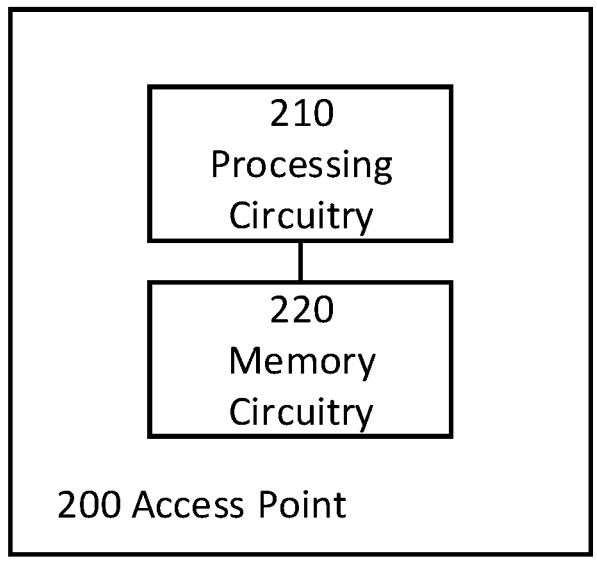
FIG. 10 shows an example implementation of an Access Point.

The AP is now going to be described with reference to FIG. 10. The AP 200 may be configured to transmit data intended for a terminal in a cell-free massive MIMO communications system. The AP 200 may be grouped into a cluster together with other APs and the cluster may operate autonomously. The cluster may be connected to, and managed by, one CPU. The AP 200 may comprise a processing circuitry 210 and a memory circuitry 220. The memory circuitry may store computer program code which, when run in the processing circuitry 210, may cause the AP 200 to receive, from the CPU, a message that the AP 200 is selected to serve the terminal and data intended for said terminal. The memory circuitry may store computer program code which, when run in the processing circuitry 210, may cause the AP 200 to independently conduct power control, exclusively considering the terminals that are served by the AP 200 itself; and to transmit said intended data to the terminal.

In one example embodiment, the memory circuitry 220 may store computer program code which, when run in the processing circuitry 210, causes the AP 200 to receive an uplink pilot from the terminal and estimate uplink channel condition from said uplink pilot. The uplink channel condition, or CSI, may be e.g. channel gain.

In one embodiment, the memory circuitry 220 may store computer program code which, when run in the processing circuitry 210, causes the AP 200 to determine, based on a metric related to a relation between the AP 200 and the terminal, that the AP 200 can serve the terminal. The AP 200 may then be caused to transmit a message to the CPU that the AP 200 can serve the terminal. The metric may for example be a channel condition and the memory circuitry 220 storing computer program code which, when run in the processing circuitry 210, may cause the AP 200 to determine that the AP 200 can serve the terminal based on the channel condition estimated by the AP from uplink pilots received from the terminal. The channel condition may comprise information about the condition of the channel between the AP and the terminal and may be, for example, CSI. The channel condition may be, for example, channel gain, path loss, shadowing etc.

In one embodiment, the memory circuitry 220 may store computer program code which, when run in the processing circuitry 210, causes the AP 200 to conduct power control by calculate a power control coefficient (η) for use with the terminal. The power control coefficient (η) may be calculated by a normalized function f(•) of at least one parameter of the communications system, wherein the function f(•) is normalized to ensure that a power constraint of the AP's 200 is fulfilled.

As the AP may be caused to independently conduct power control, exclusively considering the terminals that are served by the AP itself, a given AP m may only involve local parameters and accordingly the power control coefficient (η) may be expressed as being calculated by the function $f_m(•)$. The normalized function f(•) may thus, according to one embodiment, be a function f(•) of one or more local parameters of the communication system.

In one embodiment, the function f(•) may be a function f(•) of variance of an estimated channel (γ) between the AP and the terminal. According to another embodiment, the function f(•) may be a function f(•) of variances of estimated channels (γ) between the AP and at least a subset of terminals served by the AP.

According to a third aspect, there is provided a method 300, implemented in a CPU for transmitting data intended for a terminal in a cell-free massive MIMO communications system.

Figure 11:
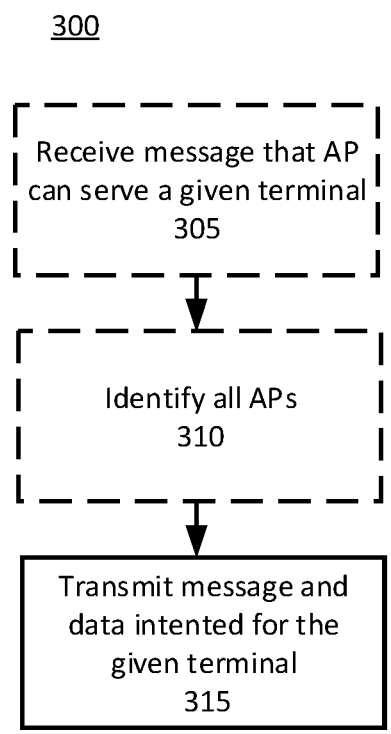
FIG. 11 is a flowchart illustrating example embodiments of method steps.

With reference to FIGS. 8 and 11, a first embodiment will now be described. FIG. 11 illustrates the method, implemented by the CPU, for transmitting data intended for a terminal in a cell-free massive MIMO communications system.

The CPU may be connected to, and may manage, a cluster of APs. The cluster may operate autonomously. The method may comprise transmitting 315, to all APs in the cluster, a message that the receiving APs are selected to serve the terminal and said data intended for the terminal.

As the CPU is connected only to the APs forming the cluster, the deployment complexity may be reduced. There may be no need to connect the "whole world" as in the canonical cell-free massive MIMO concept. This may result in lower fronthaul network requirements and increased system scalability as the number of APs and terminals grows large. This may also improve latency since the CPU may be closer to the APs.

In one embodiment, the method may further comprise receiving 305, from an AP 200 within the cluster, a message that said AP 200 can serve the terminal. The method may further comprise identifying 310 all APs in the cluster that the CPU 400 manages.

According to a fourth aspect, there is provided a CPU for implementing the method according to the third aspect.

Figure 12:
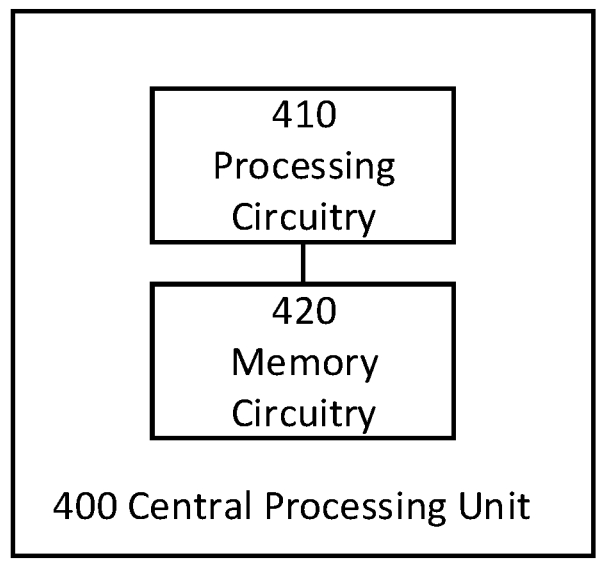
FIG. 12 shows an example implementation of a CPU.

The CPU may now be described with reference to FIG. 12.

The CPU 400 may be configured to transmit data intended for a terminal in a cell-free massive MIMO communications system, wherein the CPU 400 may be connected to, and may manage, a cluster of APs. The cluster may operate autonomously. The CPU 400 may comprise a processing circuitry 410 and a memory circuitry 420. The memory circuitry 420 may store computer program code which, when run in the processing circuitry 410, may cause the CPU 400 to transmit, to all APs in the cluster, a message that the receiving APs are selected to serve the terminal and said data intended for the terminal.

In one embodiment, the memory circuitry 420 may store computer program code which, when run in the processing circuitry 410, causes the CPU 400 to receive, from an AP 200 within the cluster, a message that said AP 200 can serve the terminal. The CPU 400 may further be caused to identify all APs in the cluster that the CPU 400 manages.

Figure 13:
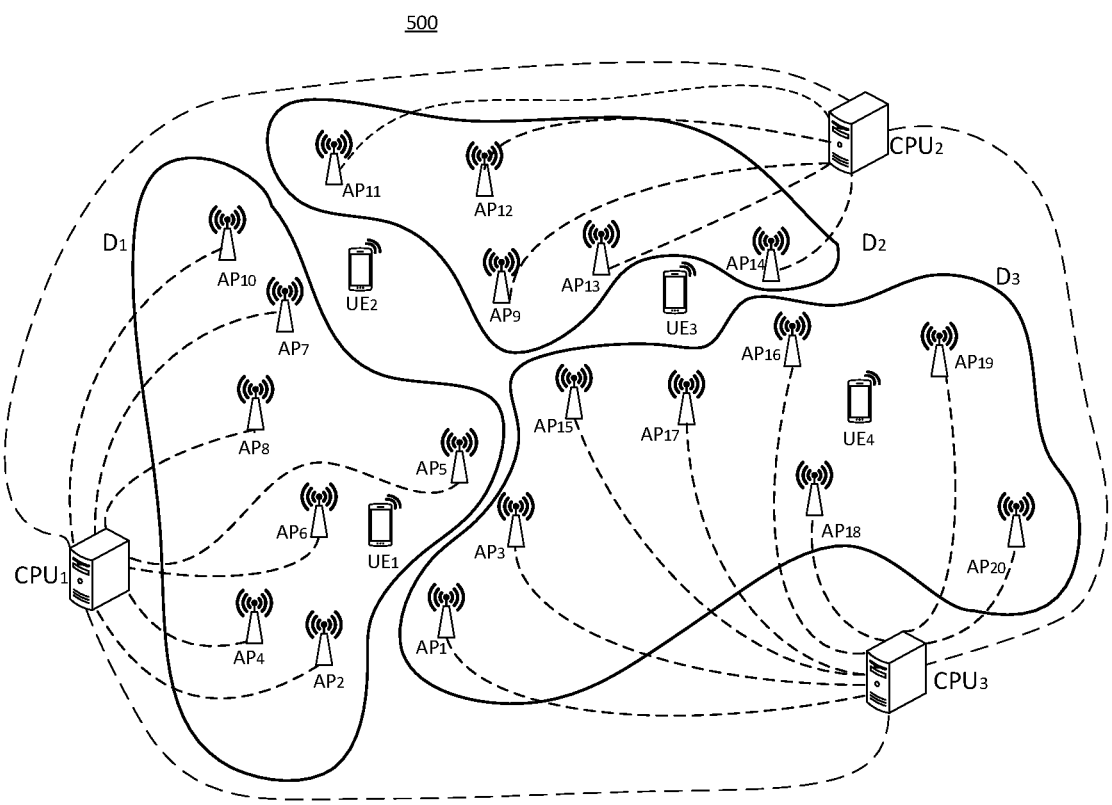
FIG. 13 illustrates an example implementation of a cell-free massive MIMO communications system.

According to a fifth aspect, there is provided a cell-free massive Multiple-Input and Multiple-Output (MIMO) communications system for transmitting data to a terminal. An example embodiment of such system is illustrated in FIG. 13.

The MIMO communications system 500 may comprise multiple CPUs according to the fourth aspect. Each CPU 400 is interconnected with the other CPUs. The MIMO communications system may further comprise multiple APs 200 according to the second aspect. The APs are grouped into clusters which operate autonomously. Each cluster is connected to, and managed by, one CPU 400 respectively.

According to a sixth aspect, there is provided a computer program comprising instructions which, when executed on a processing circuitry, may cause the processing circuitry to carry out the method according to the first aspect and/or the third aspect.

According to a seventh aspect, there is provided a carrier containing the computer program of the sixth aspect, wherein the carrier may be one of an electronic signal, optical signal, radio signal, or computer readable storage medium.

Certain embodiments may provide one or more of the following technical advantage(s).

The proposed embodiments aim to make a cell-free Massive MIMO system fully scalable and distributed.

The presence of multiple CPUs, each one managing an access point cluster, may allow to reduce the deployment complexity. A given CPU is connected only to the APs forming the cluster. There is no need to connect the "whole world" as in the canonical Cell-free Massive MIMO concept. This may result in lower fronthaul network requirements and increased system scalability as the number of AP and terminal grows large. This may also improve latency since CPUs are closer to the APs.

The fact that each terminal is served by very few AP clusters, according to the user-centric approach, may enable a limited distribution of the data payload. The data exchange associated with a given terminal may involve only the APs and the CPUs selected from the user-centric design criterion. This may contribute to limiting the load of the fronthaul network.

From the AP perspective, the number of terminals to serve may be reduced. Indeed, each AP may serve a subset of terminals, but only those ones for which it has been selected, according to the user-centric approach. This may reduce the computational complexity at each AP when it comes to estimate the channel, to define the precoder, to calculate the power control coefficients, and to decode and forward data in uplink and downlink.

Compared to the disjoint AP cluster architecture, where a given terminal is connected to only a single cluster (cell-centric approach), the user-centric design may allow to increase the downlink spectral efficiency by leveraging the joint coherent transmission and the joint interference control among multiple cooperating AP clusters. In such a system the terminal experiences no cell boundaries because it may always be surrounded by serving APs.

Power control policies can be conducted locally and autonomously at each AP. There is no information exchange neither among APs within a cluster or among different clusters. The calculation of the power control coefficients may thus be scalable and fully distributed.

According to the present disclosure, APs are grouped into N pre-determined clusters $D_1, \ldots, D_N$, as illustrated in FIG. 13. Each cluster in turn is connected to one CPU. The CPUs are interconnected but may operate autonomously. It may be assumed that a global phase reference is shared.

Each terminal may receive service from one or a few AP clusters. $B_k$ may be the number of AP clusters that may participate in the service of the kth terminal (generally this may be a small number, often unity). These AP clusters may be denoted by $D_{k1}, \ldots, D_{kB_k}$.

To select the clusters, the user-centric concept is applied. Specifically, for the kth terminal, the $L_k$ closest access points $AP_{k1}, \ldots, AP_{kL_k}$, according to some metric are identified. The $D_{k1}, \ldots, D_{kB_k}$ are then taken to be the APs clusters to which $AP_{k1}, \ldots, AP_{kL_k}$ belong.

The above stated metric may for example be a channel condition, or CSI, i.e. information about the condition of the channel. Examples of such information may be channel gain, path loss and shadowing. The channel gain, which may incorporate path loss gain, may for example depend on the distance between AP and terminal.

The data to the kth terminal is distributed to central processing units $CPU_{k1}, \ldots, CPU_{kB_k}$.

Figure 14:
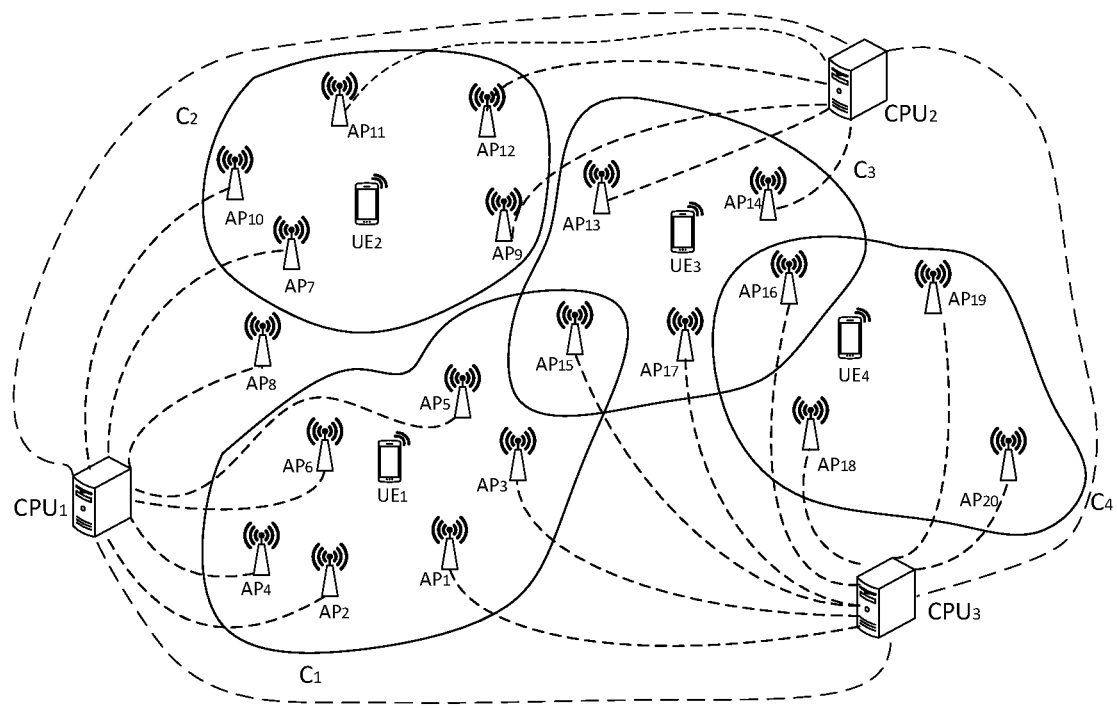
FIG. 14 shows an example embodiment of a user-centric AP subset selection.

An example illustrating how a user-centric AP subset may look like, is provided in FIG. 14. A user-centric AP subset, denoted in the figure by $C_k$, might include APs belonging to different AP clusters. Hence, terminal k may be served by all the APs belonging to the selected clusters. For instance, $UE_2$, in the figure, may be served by all the APs in cluster $D_1$ and $D_2$.

Figure 15A:
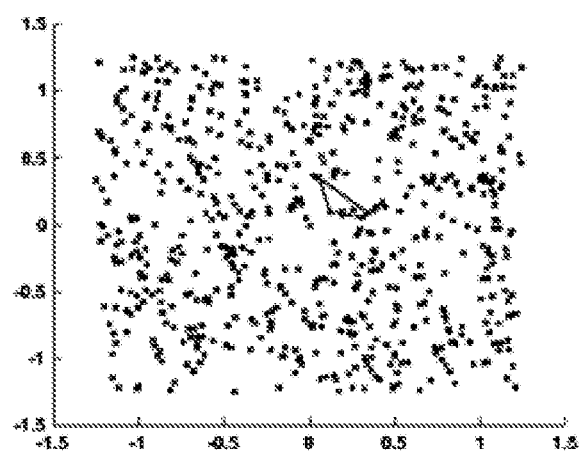
FIG. 15a shows an example of when only the best cluster of APs serves the terminal.
Figure 15B:
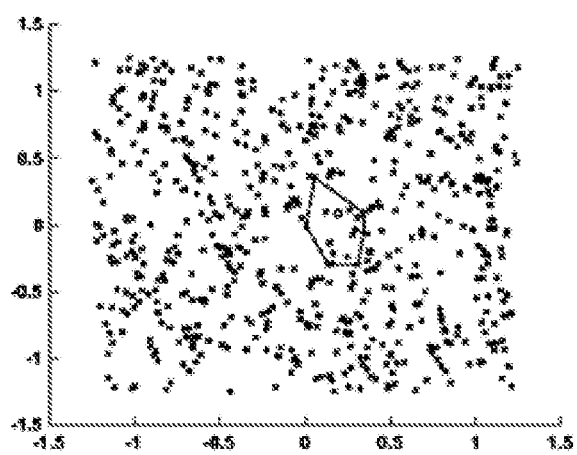
FIG. 15b shows an example of when all APs in the two best AP clusters serve the terminal.

The example in FIGS. 15a and 15b illustrate this principle further. The Figures depict the principle of selecting APs to serve a given user, or a given terminal. In FIG. 15a, a terminal is served only by its primary AP cluster, i.e. only the best AP cluster serves the terminal. In FIG. 15b, the terminal is served by $D_{k1}, \ldots, D_{kB_k}$ (here $B_k=2$ and the two APs clusters that have been "merged" can be identified by visual inspection from the figure), i.e. all APs in the two best AP clusters serve the terminal.

Power control is applied independently in each AP, hence eliminating the need for interaction between the APs within the same cluster and between different clusters. Here, the following formula was used $$\eta_{mk} = \begin{cases} \dfrac{f(\gamma_{mk})}{\sum_{k' \in T_m} \gamma_{mk'} f(\gamma_{mk'})}, & \text{if } m \in \{D_{k1} \cup \ldots \cup D_{kB_k}\} \\ 0, & \text{else} \end{cases} \quad (5)$$

where $f(\bullet)$ is a pre-determined function, and where $T_m$ is the set of terminals served by $AP_m$, i.e., given m, the set of k for which $m \in \{D_k \cup \ldots \cup D_{kB_k}\}$. Importantly, there is no interaction between any clusters and APs of the same cluster, in the selection of the power control coefficients. The normalization in the denominator of (5) is important as it guarantees that (3) is satisfied, i.e. that $\Sigma_k \eta_{mk} \gamma_{mk} \leq 1$ for all m. The function $f(x)$ may preferably be selected such that the effective power received by terminal k from AP m, $\eta_{mk} \gamma_{mk}$ scales proportionally, at an appropriate rate, with the mean-square channel estimate, $\gamma_{mk}$.

Figure 16:
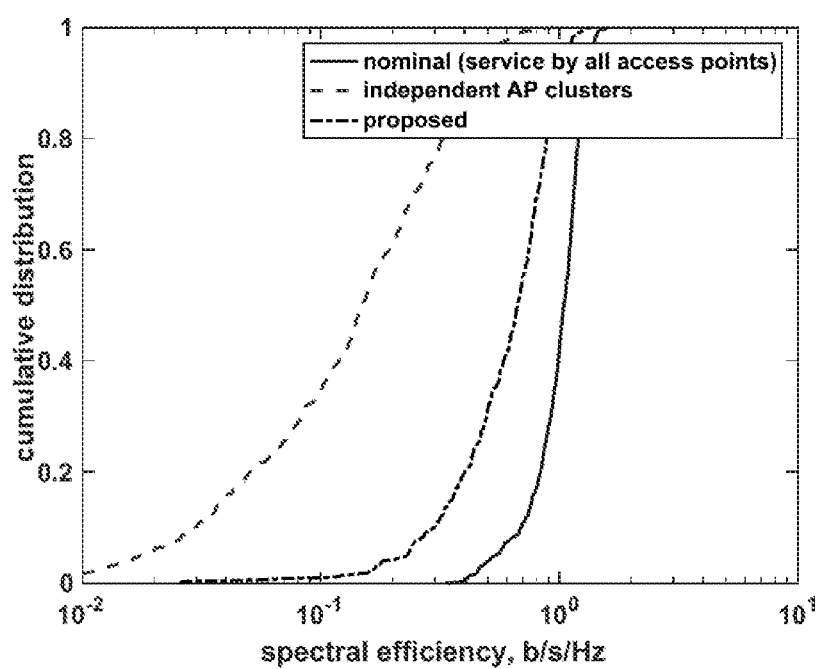
FIG. 16 shows a performance example of an example method.

FIG. 16 shows a performance example depicting the benefits of the proposed method in relation to previous approaches. The proposed method is illustrated as a dash-dotted line. The solid curve represents a non-scalable system where all APs are coordinated by a single CPU. The dashed curve represents a system that is scalable, where each AP cluster operates independently, but the performance is poor. In FIG. 16, a performance example using $$f(x) = \frac{1}{\sqrt{x}}$$

(dash-dotted line) is provided. Note that with this particular choice of $f(x)$, $\eta_{mk}$ becomes $$\eta_{mk} = \begin{cases} \dfrac{\frac{1}{\sqrt{\gamma_{mk}}}}{\sum_{k' \in T_m} \frac{1}{\sqrt{\gamma_{mk'}}}}, & \text{if } m \in \{D_{k1} \cup \ldots \cup D_{kB_k}\} \\ 0, & \text{else} \end{cases} \quad (6)$$

It may happen rather infrequently that a terminal may be served by more than one AP cluster ($B_k > 1$), but when it may occur, it may have a large impact on performance.

In another embodiment, the function $f(\cdot)$ may be dependent on other parameters in the system, for example, $$\eta_{mk} = \begin{cases} \dfrac{f(G_{mk})}{\sum_{k' \in T_m} \gamma_{mk'} f(G_{mk'})}, & \text{if } m \in \{D_{k1} \cup \ldots \cup D_{kB_k}\} \\ 0, & \text{else} \end{cases} \quad (7)$$

where $G_{mk}$ is a set that comprises $\gamma_{mk'}$ for all $k' \in T_m$, or a subset thereof. The set $G_{mk}$ could also comprise, for example, $\beta_{mk'}$ for all $k' \in T_m$, or a subset thereof, or other parameters of the system.

Figure 17:
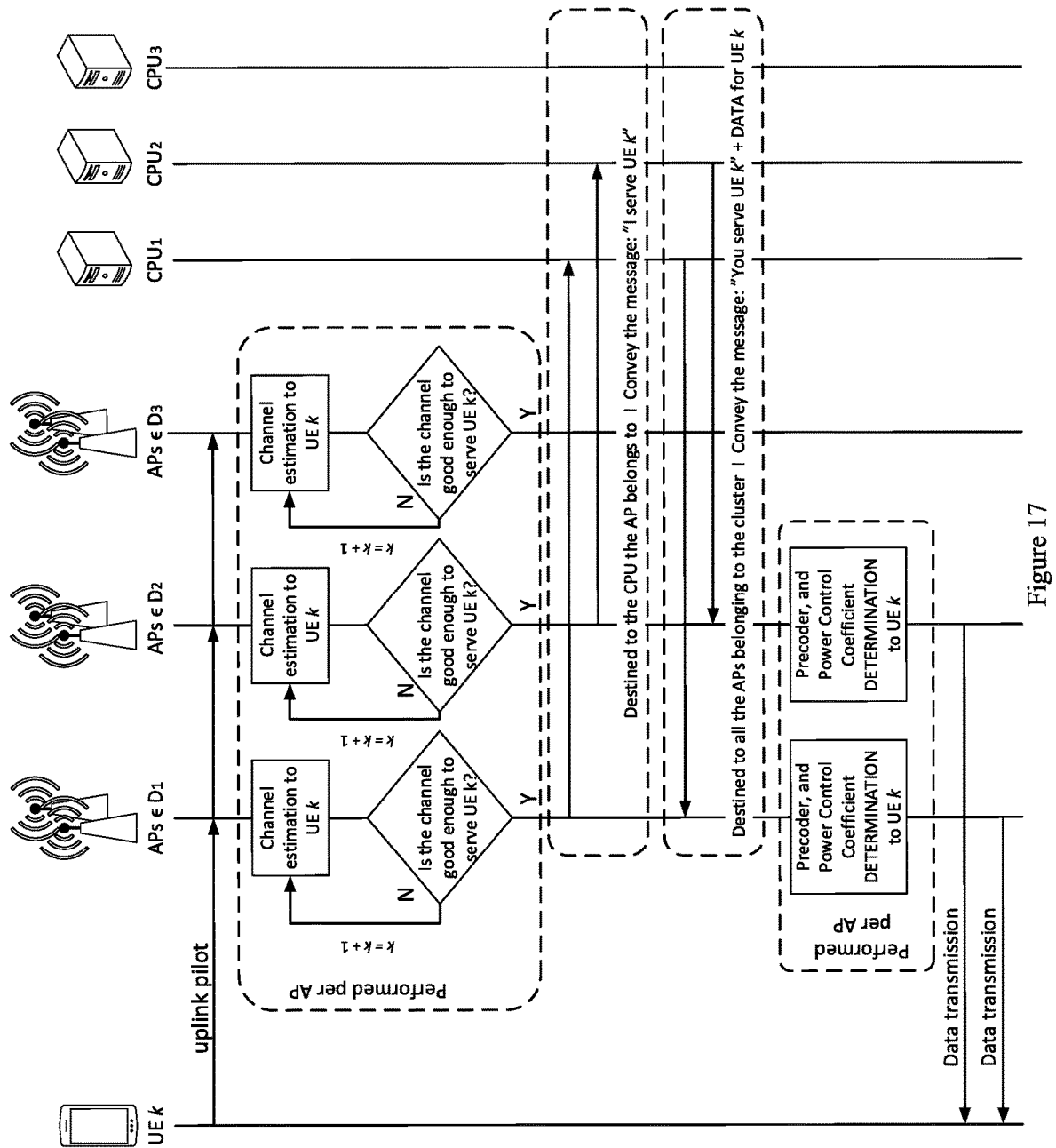
FIG. 17 illustrates a signaling diagram of an example embodiment.

The signalling diagram in FIG. 17 may depict the operation of the present disclosure from the terminal k perspective, e.g. from an UE k perspective. In the figure, the same example as before is used; i.e. UE 2, is served by all the APs in the cluster $D_1 \cup D_2$, since the user-centric APs subset $C_2$ involves APs of cluster $D_1$ and $D_2$. No APs of cluster $D_3$ are selected, and therefore $CPU_3$ does not participate in serving $UE_2$. The data transmission does not regard only UE k. A given AP m serve coherently all the terminals belonging to $T_m$, as follows: $x_m = \sqrt{\rho_d} \sum_{k \in T_m} \sqrt{\eta_{mk}} \hat{g}_{mk}^* q_k$ (which differs from (1), i.e. $x_m = \sqrt{\rho_d} \sum_{k=1}^{K} \sqrt{\eta_{mk}} \hat{g}_{mk}^* q_k$, as not all the UEs are served when such a user-centric transmission is designed).

Figure 18:
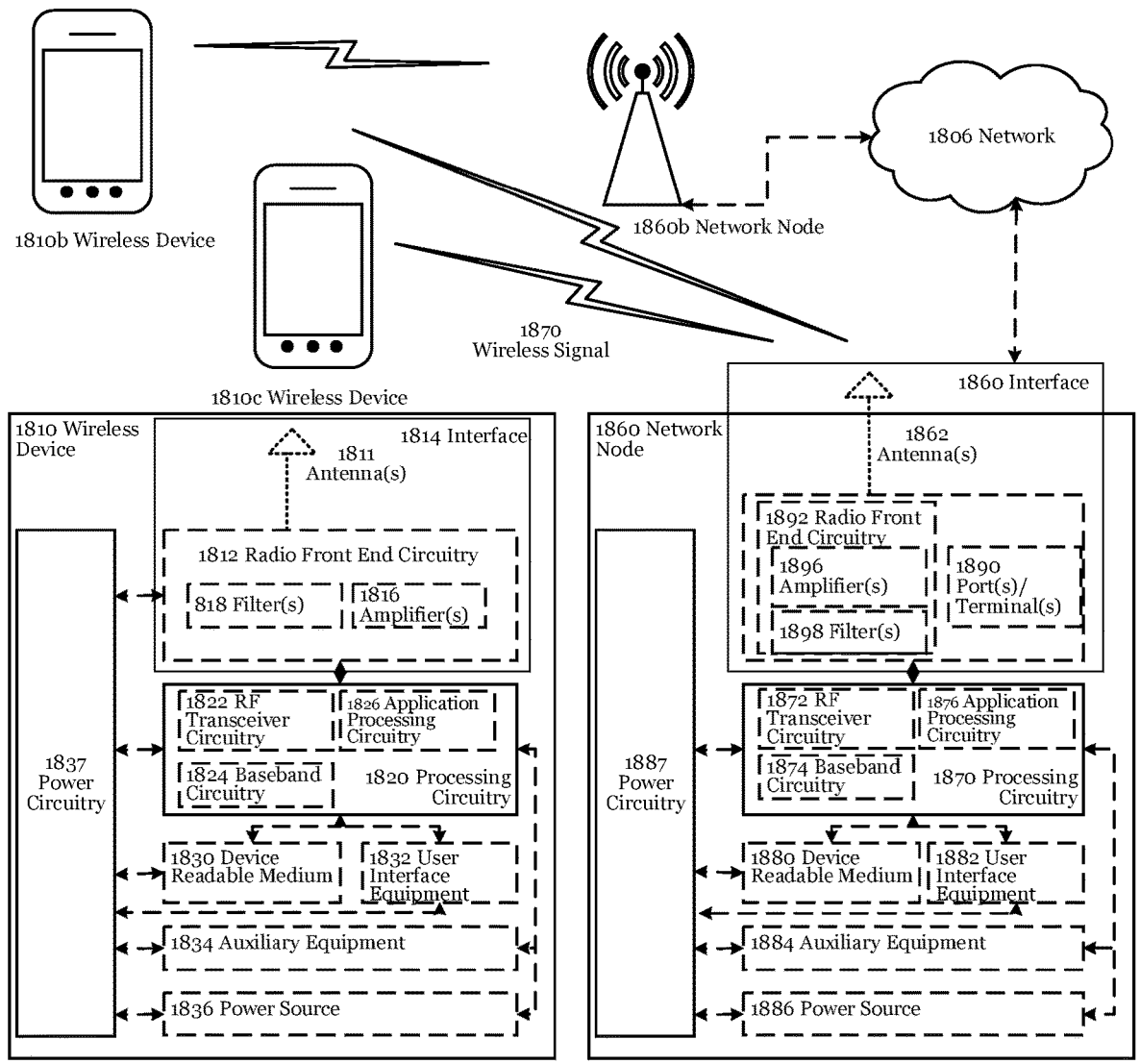
FIG. 18 illustrates an example wireless network.

Although the subject matter described herein may be implemented in any appropriate type of system using any suitable components, the embodiments described herein relate to a wireless network, such as the example wireless communication network illustrated in FIG. 18. For simplicity, the wireless communication network of FIG. 18 only depicts network 1806, network nodes 1860 and 1860b, and Wireless Devices (WDs) 1810, 1810b, and 1810c. The wireless communication network may further include any additional elements suitable to support communication between wireless devices or between a wireless device and another communication device, such as a landline telephone. Of the illustrated components, network node 1860 and wireless device (WD) 1810 are depicted with additional detail. The illustrated wireless communication network may provide communication and other types of services to one or more wireless devices to facilitate the wireless devices' access to and/or use of the services provided by the wireless communication network.

The wireless communication network may comprise and/or interface with any type of communication, telecommunication, data, cellular, and/or radio network or other similar type of system. In some embodiments, the wireless communication network may be configured to operate according to specific standards or other types of predefined rules or procedures. Thus, particular embodiments of the wireless communication network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards.

Network 1806 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1860 and WD 1810 comprise various components described in more detail below. These components may work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless communication network to enable and/or provide wireless access to the wireless device and/or to perform other functions (e.g., administration) in the wireless communication network. Examples of network nodes include, but are not limited to, access points (APs) (e.g., radio access points), base stations (BSs) (e.g., radio base stations, Node Bs, and evolved Node Bs (eNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, network node 1860 may be a virtual network node as described in more detail below. More generally, however, network nodes may represent any suitable device (or group of devices) capable, configured, arranged, and/or operable to enable and/or provide a wireless device with access to the wireless communication network or to provide some service to a wireless device that has accessed the wireless communication network.

In FIG. 18, Network node 1860 includes processing circuitry 1870, device readable medium 1880, interface 1890, user interface equipment 1882, auxiliary equipment 1884, power source 1886, power circuitry 1887, and antenna 1862. Although network node 1860 illustrated in the example wireless communication network of FIG. 18 may represent a device that includes the illustrated combination of hardware components, other embodiments may comprise network nodes with different combinations of components. It is to be understood that a network node may comprise any suitable combination of hardware and/or software needed to perform the tasks, features, functions and methods disclosed herein. Moreover, while the components of network node 1860 are depicted as single boxes located within a larger box, or nested within multiple boxes, in practice, a network node may comprise multiple different physical components that make up a single illustrated component (e.g., device readable medium 1880 may comprise multiple separate hard drives as well as multiple RAM modules).

Similarly, network node 1860 may be composed of multiple physically separate components (e.g., a NodeB component and a RNC component, or a BTS component and a BSC component, etc.), which may each have their own respective components. In certain scenarios in which network node 1860 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, network node 1860 may be configured to support multiple radio access technologies (RATs). In such embodiments, some components may be duplicated (e.g., separate device readable medium 1880 for the different RATs) and some components may be reused (e.g., the same antenna 1862 may be shared by the RATs). Network node 1860 may also include multiple sets of the various illustrated components for different wireless technologies integrated into network node 1860, such as, for example, GSM, WCDMA, LTE, NR, WiFi, or Bluetooth wireless technologies. These wireless technologies may be integrated into the same or different chip or set of chips and other components within network node 1860.

Processing circuitry 1870 is configured to perform any determining, calculating, or similar operations (e.g., certain obtaining operations) described herein as being provided by a network node. These operations performed by processing circuitry 1870 may include processing information obtained by processing circuitry 1870 by, for example, converting the obtained information into other information, comparing the obtained information or converted information to information stored in the network node, and/or performing one or more operations based on the obtained information or converted information, and as a result of said processing making a determination.

Processing circuitry 1870 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1860 components, such as device readable medium 1880, network node 1860 functionality. For example, processing circuitry 1870 may execute instructions stored in device readable medium 1880 or in memory within processing circuitry 1870. Such functionality may include providing any of the various wireless features or benefits discussed herein. In some embodiments, processing circuitry 1870 may include a system on a chip (SOC).

In some embodiments, processing circuitry 1870 may include one or more of radio frequency (RF) transceiver circuitry 1872 and baseband processing circuitry 1874. In some embodiments, radio frequency (RF) transceiver circuitry 1872 and baseband processing circuitry 1874 may be on separate chips (or sets of chips), boards, or units, such as radio units and digital units. In alternative embodiments, part or all of RF transceiver circuitry 1872 and baseband processing circuitry 1874 may be on the same chip or set of chips, boards, or units.

In certain embodiments, some or all of the functionality described herein as being provided by a network node, base station, eNB or other such network device may be provided by processing circuitry 1870 executing instructions stored on device readable medium 1880 or memory within processing circuitry 1870. In alternative embodiments, some or all of the functionality may be provided by processing circuitry 1870 without executing instructions stored on a separate or discrete device readable medium, such as in a hard-wired manner. In any of those embodiments, whether executing instructions stored on a device readable storage medium or not, processing circuitry 1870 can be configured to perform the described functionality. The benefits provided by such functionality are not limited to processing circuitry 1870 alone or to other components of network node 1860, but are enjoyed by network node 1860 as a whole, and/or by end users and the wireless network generally.

Device readable medium 1880 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1870. Device readable medium 1880 may store any suitable instructions, data or information, including a computer program, software, an application including one or more of logic, rules, code, tables, etc. and/or other instructions capable of being executed by processing circuitry 1870 and, utilized by network node 1860. Device readable medium 1880 may be used to store any calculations made by processing circuitry 1870 and/or any data received via interface 1890. In some embodiments, processing circuitry 1870 and device readable medium 1880 may be considered to be integrated.

Interface 1890 is used in the wired or wireless communication of signaling and/or data between network node 1860, network 1806, and/or WDs 1810. As illustrated, interface 1890 comprises port(s)/terminal(s) 1894 to send and receive data, for example to and from network 1806 over a wired connection. Interface 1890 also includes radio front end circuitry 1892 that may be coupled to, or in certain embodiments a part of, antenna 1862. Radio front end circuitry 1892 comprises filters 1898 and amplifiers 1896. Radio front end circuitry 1892 may be connected to antenna 1862 and processing circuitry 1870. Radio front end circuitry may be configured to condition signals communicated between antenna 1862 and processing circuitry 1870. Radio front end circuitry 1892 may receive digital data that is to be sent out to other network nodes or WDs via a wireless connection. Radio front end circuitry 1892 may convert the digital data into a radio signal having the appropriate channel and bandwidth parameters using a combination of filters 1898 and/or amplifiers 1896. The radio signal may then be transmitted via antenna 1862. Similarly, when receiving data, antenna 1862 may collect radio signals which are then converted into digital data by radio front end circuitry 1892. The digital data may be passed to processing circuitry 1870. In other embodiments, the interface may comprise different components and/or different combinations of components.

In certain alternative embodiments, network node 1860 may not include separate radio front end circuitry 1892, instead, processing circuitry 1870 may comprise radio front end circuitry and may be connected to antenna 1862 without separate radio front end circuitry 1892. Similarly, in some embodiments, all or some of RF transceiver circuitry 1872 may be considered a part of interface 1890. In still other embodiments, interface 1890 may include one or more ports or terminals 1894, radio front end circuitry 1892, and RF transceiver circuitry 1872, as part of a radio unit (not shown), and interface 1890 may communicate with baseband processing circuitry 1874, which is part of a digital unit (not shown).

Antenna 1862 may include one or more antennas, or antenna arrays, configured to send and/or receive wireless signals. Antenna 1862 may be coupled to radio front end circuitry 1890 and may be any type of antenna capable of transmitting and receiving data and/or signals wirelessly. In some embodiments, antenna 1862 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1862 may be separate from network node 1860 and may be connectable to network node 1860 through an interface or port.

Antenna 1862, interface 1890, and/or processing circuitry 1870 may be configured to perform any receiving operations and/or certain obtaining operations described herein as being performed by a network node. Any information, data and/or signals may be received from a wireless device, another network node and/or any other network equipment. Similarly, antenna 1862, interface 1890, and/or processing circuitry 1870 may be configured to perform any transmitting operations described herein as being performed by a network node. Any information, data and/or signals may be transmitted to a wireless device, another network node and/or any other network equipment.

Power circuitry 1887 may comprise, or be coupled to, power management circuitry and is configured to supply the components of network node 1860 with power for performing the functionality described herein. Power circuitry 1887 may receive power from power source 1886. Power source 1886 and/or power circuitry 1887 may be configured to provide power to the various components of network node 1860 in a form suitable for the respective components (e.g., at a voltage and current level needed for each respective component). Power source 1886 may either be included in, or external to, power circuitry 1887 and/or network node 1860. For example, network node 1860 may be connectable to an external power source (e.g., an electricity outlet) via an input circuitry or interface such as an electrical cable, whereby the external power source supplies power to power circuitry 1887. As a further example, power source 1886 may comprise a source of power in the form of a battery or battery pack which is connected to, or integrated in, power circuitry 1887. The battery may provide backup power should the external power source fail. Other types of power sources, such as photovoltaic devices, may also be used.

Alternative embodiments of network node 1860 may include additional components beyond those shown in FIG. 18 that may be responsible for providing certain aspects of the network node's functionality, including any of the functionality described herein and/or any functionality necessary to support the subject matter described herein. For example, network node 1860 may include user interface equipment to allow input of information into network node 1860 and to allow output of information from network node 1860. This may allow a user to perform diagnostic, maintenance, repair, and other administrative functions for network node 1860.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1810 includes antenna 1811, interface 1814, processing circuitry 1820, device readable medium 1830, user interface equipment 1832, auxiliary equipment 1834, power source 1836 and power circuitry 1837. WD 1810 may include multiple sets of one or more of the illustrated components for different wireless technologies supported by WD 1810, such as, for example, GSM, WCDMA, LTE, NR, WiFi, WiMAX, or Bluetooth wireless technologies, just to mention a few. These wireless technologies may be integrated into the same or different chips or set of chips as other components within WD 1810.

Antenna 1811 may include one or more antennas or antenna arrays, configured to send and/or receive wireless signals, and is connected to interface 1814. In certain alternative embodiments, antenna 1811 may be separate from WD 1810 and be connectable to WD 1810 through an interface or port. Antenna 1811, interface 1814, and/or processing circuitry 1820 may be configured to perform any receiving or transmitting operations described herein as being performed by a WD. Any information, data and/or signals may be received from a network node and/or another WD. In some embodiments, radio front end circuitry and/or antenna 1811 may be considered an interface.

As illustrated, interface 1814 comprises radio front end circuitry 1812 and antenna 1811. Radio front end circuitry 1812 comprise one or more filters 1818 and amplifiers 1816. Radio front end circuitry 1814 is connected to antenna 1811 and processing circuitry 1820, and is configured to condition signals communicated between antenna 1811 and processing circuitry 1820. Radio front end circuitry 1812 may be coupled to or a part of antenna 1811. In some embodiments, WD 1810 may not include separate radio front end circuitry 1812; rather, processing circuitry 1820 may comprise radio front end circuitry and may be connected to antenna 1811. Similarly, in some embodiments, some or all of RF transceiver circuitry 1822 may be considered a part of interface 1814. Radio front end circuitry 1812 may receive digital data that is to be sent out to other network nodes or WDs via a wireless connection. Radio front end circuitry 1812 may convert the digital data into a radio signal having the appropriate channel and bandwidth parameters using a combination of filters 1818 and/or amplifiers 1816. The radio signal may then be transmitted via antenna 1811. Similarly, when receiving data, antenna 1811 may collect radio signals which are then converted into digital data by radio front end circuitry 1812. The digital data may be passed to processing circuitry 1820. In other embodiments, the interface may comprise different components and/or different combinations of components.

Processing circuitry 1820 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1810 components, such as device readable medium 1830, WD 1810 functionality. Such functionality may include providing any of the various wireless features or benefits discussed herein. For example, processing circuitry 1820 may execute instructions stored in device readable medium 1830 or in memory within processing circuitry 1820 to provide the functionality disclosed herein.

As illustrated, processing circuitry 1820 includes one or more of RF transceiver circuitry 1822, baseband processing circuitry 1824, and application processing circuitry 1826. In other embodiments, the processing circuitry may comprise different components and/or different combinations of components. In certain embodiments processing circuitry 1820 of WD 1810 may comprise a SOC. In some embodiments, RF transceiver circuitry 1822, baseband processing circuitry 1824, and application processing circuitry 1826 may be on separate chips or sets of chips. In alternative embodiments, part or all of baseband processing circuitry 1824 and application processing circuitry 1826 may be combined into one chip or set of chips, and RF transceiver circuitry 1822 may be on a separate chip or set of chips. In still alternative embodiments, part or all of RF transceiver circuitry 1822 and baseband processing circuitry 1824 may be on the same chip or set of chips, and application processing circuitry 1826 may be on a separate chip or set of chips. In yet other alternative embodiments, part or all of RF transceiver circuitry 1822, baseband processing circuitry 1824, and application processing circuitry 1826 may be combined in the same chip or set of chips. In some embodiments, RF transceiver circuitry 1822 may be a part of interface 1814. RF transceiver circuitry 1822 may condition RF signals for processing circuitry 1820.

In certain embodiments, some or all of the functionality described herein as being performed by a WD may be provided by processing circuitry 1820 executing instructions stored on device readable medium 1830, which in certain embodiments may be a computer-readable storage medium. In alternative embodiments, some or all of the functionality may be provided by processing circuitry 1820 without executing instructions stored on a separate or discrete device readable storage medium, such as in a hard-wired manner. In any of those particular embodiments, whether executing instructions stored on a device readable storage medium or not, processing circuitry 1820 can be configured to perform the described functionality. The benefits provided by such functionality are not limited to processing circuitry 1820 alone or to other components of WD 1810, but are enjoyed by WD 1810 as a whole, and/or by end users and the wireless network generally.

Processing circuitry 1820 may be configured to perform any determining, calculating, or similar operations (e.g., certain obtaining operations) described herein as being performed by a WD. These operations, as performed by processing circuitry 1820, may include processing information obtained by processing circuitry 1820 by, for example, converting the obtained information into other information, comparing the obtained information or converted information to information stored by WD 1810, and/or performing one or more operations based on the obtained information or converted information, and as a result of said processing making a determination.

Device readable medium 1830 may be operable to store a computer program, software, an application including one or more of logic, rules, code, tables, etc. and/or other instructions capable of being executed by processing circuitry 1820. Device readable medium 1830 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1820. In some embodiments, processing circuitry 1820 and device readable medium 1830 may be considered to be integrated.

User interface equipment 1832 may provide components that allow for a human user to interact with WD 1810. Such interaction may be of many forms, such as visual, audial, tactile, etc. User interface equipment 1832 may be operable to produce output to the user and to allow the user to provide input to WD 1810. The type of interaction may vary depending on the type of user interface equipment 1832 installed in WD 1810. For example, if WD 1810 is a smart phone, the interaction may be via a touch screen; if WD 1810 is a smart meter, the interaction may be through a screen that provides usage (e.g., the number of gallons used) or a speaker that provides an audible alert (e.g., if smoke is detected). User interface equipment 1832 may include input interfaces, devices and circuits, and output interfaces, devices and circuits. User interface equipment 1832 is configured to allow input of information into WD 1810, and is connected to processing circuitry 1820 to allow processing circuitry 1820 to process the input information. User interface equipment 1832 may include, for example, a microphone, a proximity or other sensor, keys/buttons, a touch display, one or more cameras, a USB port, or other input circuitry. User interface equipment 1832 is also configured to allow output of information from WD 1810, and to allow processing circuitry 1820 to output information from WD 1810. User interface equipment 1832 may include, for example, a speaker, a display, vibrating circuitry, a USB port, a headphone interface, or other output circuitry. Using one or more input and output interfaces, devices, and circuits, of user interface equipment 1832, WD 1810 may communicate with end users and/or the wireless network, and allow them to benefit from the functionality described herein.

Auxiliary equipment 1834 is operable to provide more specific functionality which may not be generally performed by WDs. This may comprise specialized sensors for doing measurements for various purposes, interfaces for additional types of communication such as wired communications etc. The inclusion and type of components of auxiliary equipment 1834 may vary depending on the embodiment and/or scenario.

Power source 1836 may, in some embodiments, be in the form of a battery or battery pack. Other types of power sources, such as an external power source (e.g., an electricity outlet), photovoltaic devices or power cells, may also be used. WD 1810 may further comprise power circuitry 1837 for delivering power from power source 1836 to the various parts of WD 1810 which need power from power source 1836 to carry out any functionality described or indicated herein. Power circuitry 1837 may in certain embodiments comprise power management circuitry. Power circuitry 1837 may additionally or alternatively be operable to receive power from an external power source; in which case WD 1810 may be connectable to the external power source (such as an electricity outlet) via input circuitry or an interface such as an electrical power cable. Power circuitry 1837 may also in certain embodiments be operable to deliver power from an external power source to power source 1836. This may be, for example, for the charging of power source 1836. Power circuitry 1837 may perform any formatting, converting, or other modification to the power from power source 1836 to make the power suitable for the respective components of WD 1810 to which power is supplied.

Figure 19:
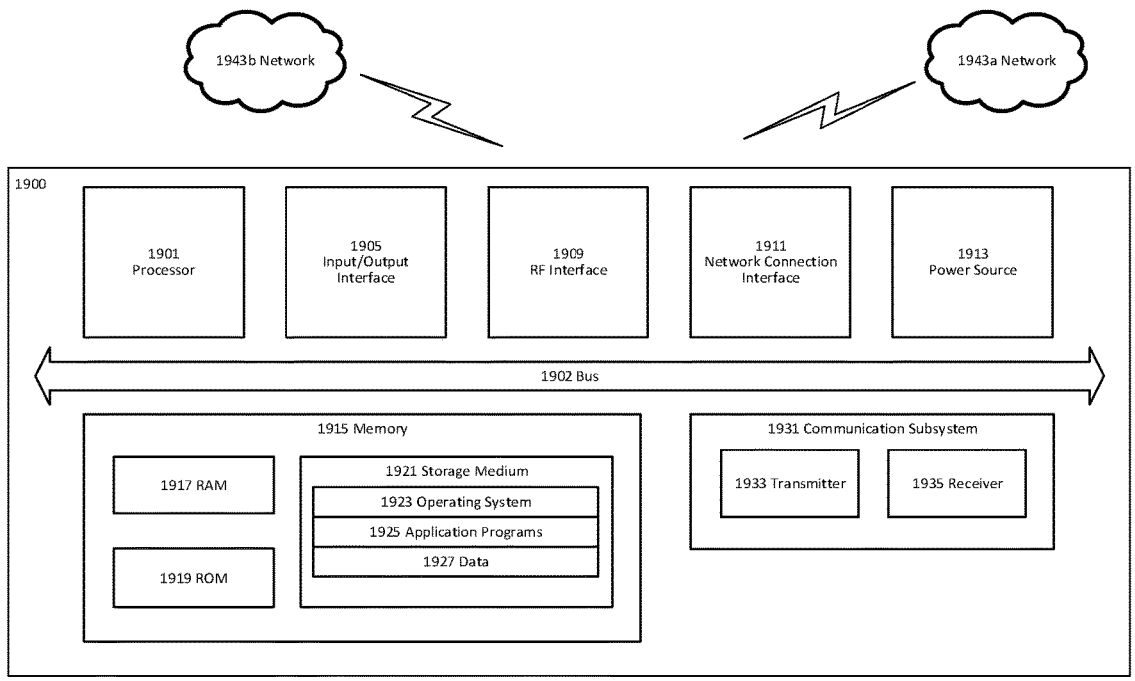
FIG. 19 shows a user equipment according to an embodiment.

FIG. 19 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1900 may be any UE identified by the 3rd Generation Partnership Project (3GPP), including a NB-IoT UE, a machine type communication (MTC) UE, and/or an enhanced MTC (eMTC) UE. UE 1900, as illustrated in FIG. 19, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 19 is a UE, the components discussed herein are equally applicable to a WD, and vice-versa.

In FIG. 19, UE 1900 includes processing circuitry 1901 that is operatively coupled to input/output interface 1905, radio frequency (RF) interface 1909, network connection interface 1911, memory 1915 including random access memory (RAM) 1917, read-only memory (ROM) 1919, and storage medium 1921 or the like, communication subsystem 1931, power source 1933, and/or any other component, or any combination thereof. Storage medium 1921 includes operating system 1923, application program 1925, and data 1927. In other embodiments, storage medium 1921 may include other similar types of information. Certain UEs may utilize all of the components shown in FIG. 19, or only a subset of the components. The level of integration between the components may vary from one UE to another UE. Further, certain UEs may contain multiple instances of a component, such as multiple processors, memories, transceivers, transmitters, receivers, etc.

In FIG. 19, processing circuitry 1901 may be configured to process computer instructions and data. Processing circuitry 1901 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1901 may include two central processing units (CPUs). Data may be information in a form suitable for use by a computer.

In the depicted embodiment, input/output interface 1905 may be configured to provide a communication interface to an input device, output device, or input and output device. UE 1900 may be configured to use an output device via input/output interface 1905. An output device may use the same type of interface port as an input device. For example, a USB port may be used to provide input to and output from UE 1900. The output device may be a speaker, a sound card, a video card, a display, a monitor, a printer, an actuator, an emitter, a smartcard, another output device, or any combination thereof. UE 1900 may be configured to use an input device via input/output interface 1905 to allow a user to capture information into UE 1900. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 19, RF interface 1909 may be configured to provide a communication interface to RF components such as a transmitter, a receiver, and an antenna. Network connection interface 1911 may be configured to provide a communication interface to network 1943a. Network 1943a may encompass wired and/or wireless networks such as a local-area network (LAN), a wide-area network (WAN), a computer network, a wireless network, a telecommunications network, another like network or any combination thereof. For example, network 1943a may comprise a Wi-Fi network. Network connection interface 1911 may be configured to include a receiver and a transmitter interface used to communicate with one or more other devices over a communication network according to one or more communication protocols, such as Ethernet, TCP/IP, SONET, ATM, or the like. Network connection interface 1911 may implement receiver and transmitter functionality appropriate to the communication network links (e.g., optical, electrical, and the like). The transmitter and receiver functions may share circuit components, software or firmware, or alternatively may be implemented separately.

RAM 1917 may be configured to interface via bus 1902 to processing circuitry 1901 to provide storage or caching of data or computer instructions during the execution of software programs such as the operating system, application programs, and device drivers. ROM 1919 may be configured to provide computer instructions or data to processing circuitry 1901. For example, ROM 1919 may be configured to store invariant low-level system code or data for basic system functions such as basic input and out put (I/O), startup, or reception of keystrokes from a keyboard that are stored in a non-volatile memory. Storage medium 1921 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1921 may be configured to include operating system 1923, application program 1925 such as a web browser application, a widget or gadget engine or another application, and data file 1927. Storage medium 1921 may store, for use by UE 1900, any of a variety of various operating systems or combinations of operating systems.

Storage medium 1921 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1921 may allow UE 1900 to access computer-executable instructions, application programs or the like, stored on transitory or non-transitory memory media, to off-load data, or to upload data. An article of manufacture, such as one utilizing a communication system may be tangibly embodied in storage medium 1921, which may comprise a device readable medium.

In FIG. 19, processing circuitry 1901 may be configured to communicate with network 1943b using communication subsystem 1931. Network 1943a and network 1943b may be the same network or networks or different network or networks. Communication subsystem 1931 may be configured to include one or more transceivers used to communicate with network 1943b. For example, communication subsystem 1931 may be configured to include one or more transceivers used to communicate with one or more remote transceivers of another device capable of wireless communication such as another WD, UE, or base station of a radio access network (RAN) according to one or more communication protocols, such as IEEE 802.19, CDMA, WCDMA, GSM, LTE, UTRAN, WiMax, or the like. Each transceiver may include transmitter 1933 and/or receiver 1935 to implement transmitter or receiver functionality, respectively, appropriate to the RAN links (e.g., frequency allocations and the like). Further, transmitter 1933 and receiver 1935 of each transceiver may share circuit components, software or firmware, or alternatively may be implemented separately.

In the illustrated embodiment, the communication functions of communication subsystem 1931 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1931 may include cellular communication, Wi-Fi communication, Bluetooth communication, and GPS communication. Network 1943b may encompass wired and/or wireless networks such as a local-area network (LAN), a wide-area network (WAN), a computer network, a wireless network, a telecommunications network, another like network or any combination thereof. For example, network 1943b may be a cellular network, a Wi-Fi network, and/or a near-field network. Power 5 source 1913 may be configured to provide alternating current (AC) or direct current (DC) power to components of UE 1900. The features, benefits and/or functions described herein may be implemented in one of the components of UE 1900 or partitioned across multiple components of UE 1900. Further, the features, benefits, and/or functions described herein may be implemented in any combination of hardware, software or firmware. In one example, communication subsystem 1931 may be configured to include any of the components described herein. Further, processing circuitry 1901 may be configured to communicate with any of such components over bus 1902. In another example, any of such components may be represented by program instructions stored in memory that when executed by processing circuitry 1901 perform the corresponding functions described herein. In another example, the functionality of any of such components may be partitioned between processing circuitry 1901 and communication subsystem 1931. In another example, the non-computationally intensive functions of any of such components may be implemented in software or firmware and the computationally intensive functions may be implemented in hardware.

Figure 20:
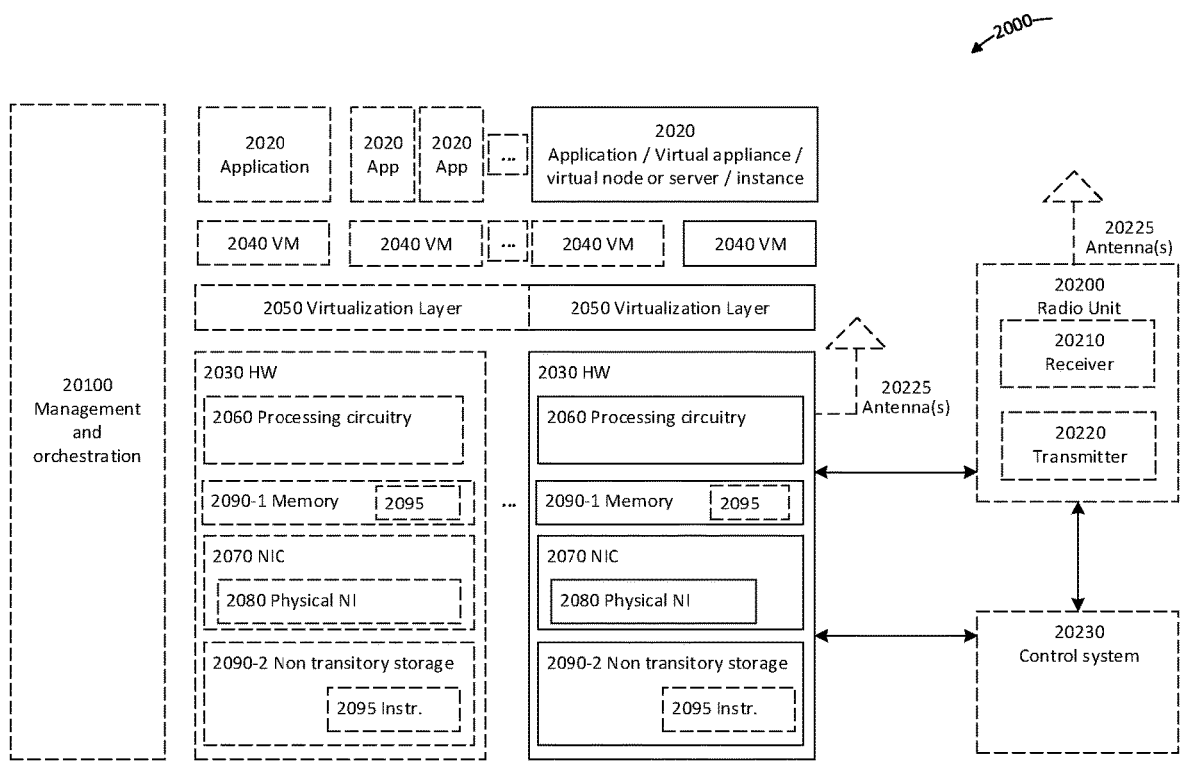
FIG. 20 shows a virtualization environment according to an embodiment.

FIG. 20 is a schematic block diagram illustrating a virtualization environment 2000 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 2000 hosted by one or more of hardware nodes 2030. Further, in embodiments in which the virtual node is not a radio access node or does not require radio connectivity (e.g., a core network node), then the network node may be entirely virtualized.

The functions may be implemented by one or more applications 2020 (which may alternatively be called software instances, virtual appliances, network functions, virtual nodes, virtual network functions, etc.) operative to implement some of the features, functions, and/or benefits of some of the embodiments disclosed herein. Applications 2020 are run in virtualization environment 2000 which provides hardware 2030 comprising processing circuitry 2060 and memory 2090. Memory 2090 contains instructions 2095 executable by processing circuitry 2060 whereby application 2020 is operative to provide one or more of the features, benefits, and/or functions disclosed herein.

Virtualization environment 2000, comprises general-purpose or special-purpose network hardware devices 2030 comprising a set of one or more processors or processing circuitry 2060, which may be commercial off-the-shelf (COTS) processors, dedicated Application Specific Integrated Circuits (ASICs), or any other type of processing circuitry including digital or analog hardware components or special purpose processors. Each hardware device may comprise memory 2090-1 which may be non-persistent memory for temporarily storing instructions 2095 or software executed by processing circuitry 2060. Each hardware device may comprise one or more network interface controllers (NICs) 2070, also known as network interface cards, which include physical network interface 2080. Each hardware device may also include non-transitory, persistent, machine-readable storage media 2090-2 having stored therein software 2095 and/or instructions executable by processing circuitry 2060. Software 2095 may include any type of software including software for instantiating one or more virtualization layers 2050 (also referred to as hypervisors), software to execute virtual machines 2040 as well as software allowing it to execute functions, features and/or benefits described in relation with some embodiments described herein.

Virtual machines 2040, comprise virtual processing, virtual memory, virtual networking or interface and virtual storage, and may be run by a corresponding virtualization layer 2050 or hypervisor. Different embodiments of the instance of virtual appliance 2020 may be implemented on one or more of virtual machines 2040, and the implementations may be made in different ways.

During operation, processing circuitry 2060 executes software 2095 to instantiate the hypervisor or virtualization layer 2050, which may sometimes be referred to as a virtual machine monitor (VMM). Virtualization layer 2050 may present a virtual operating platform that appears like networking hardware to virtual machine 2040.

As shown in FIG. 20, hardware 2030 may be a standalone network node with generic or specific components. Hardware 2030 may comprise antenna 20225 and may implement some functions via virtualization. Alternatively, hardware 2030 may be part of a larger cluster of hardware (e.g. such as in a data center or customer premise equipment (CPE)) where many hardware nodes work together and are managed via management and orchestration (MANO) 20100, which, among others, oversees lifecycle management of applications 2020.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 2040 may be a software implementation of a physical machine that runs programs as if they were executing on a physical, non-virtualized machine. Each of virtual machines 2040, and that part of hardware 2030 that executes that virtual machine, be it hardware dedicated to that virtual machine and/or hardware shared by that virtual machine with others of the virtual machines 2040, forms a separate virtual network elements (VNE).

Still in the context of NFV, Virtual Network Function (VNF) is responsible for handling specific network functions that run in one or more virtual machines 2040 on top of hardware networking infrastructure 2030 and corresponds to application 2020 in FIG. 20.

In some embodiments, one or more radio units 20200 that each include one or more transmitters 20220 and one or more receivers 20210 may be coupled to one or more antennas 20225. Radio units 20200 may communicate directly with hardware nodes 2030 via one or more appropriate network interfaces and may be used in combination with the virtual components to provide a virtual node with radio capabilities, such as a radio access node or a base station.

In some embodiments, some signaling can be affected with the use of control system 20230 which may alternatively be used for communication between the hardware nodes 2030 and radio units 20200.

Figure 21:
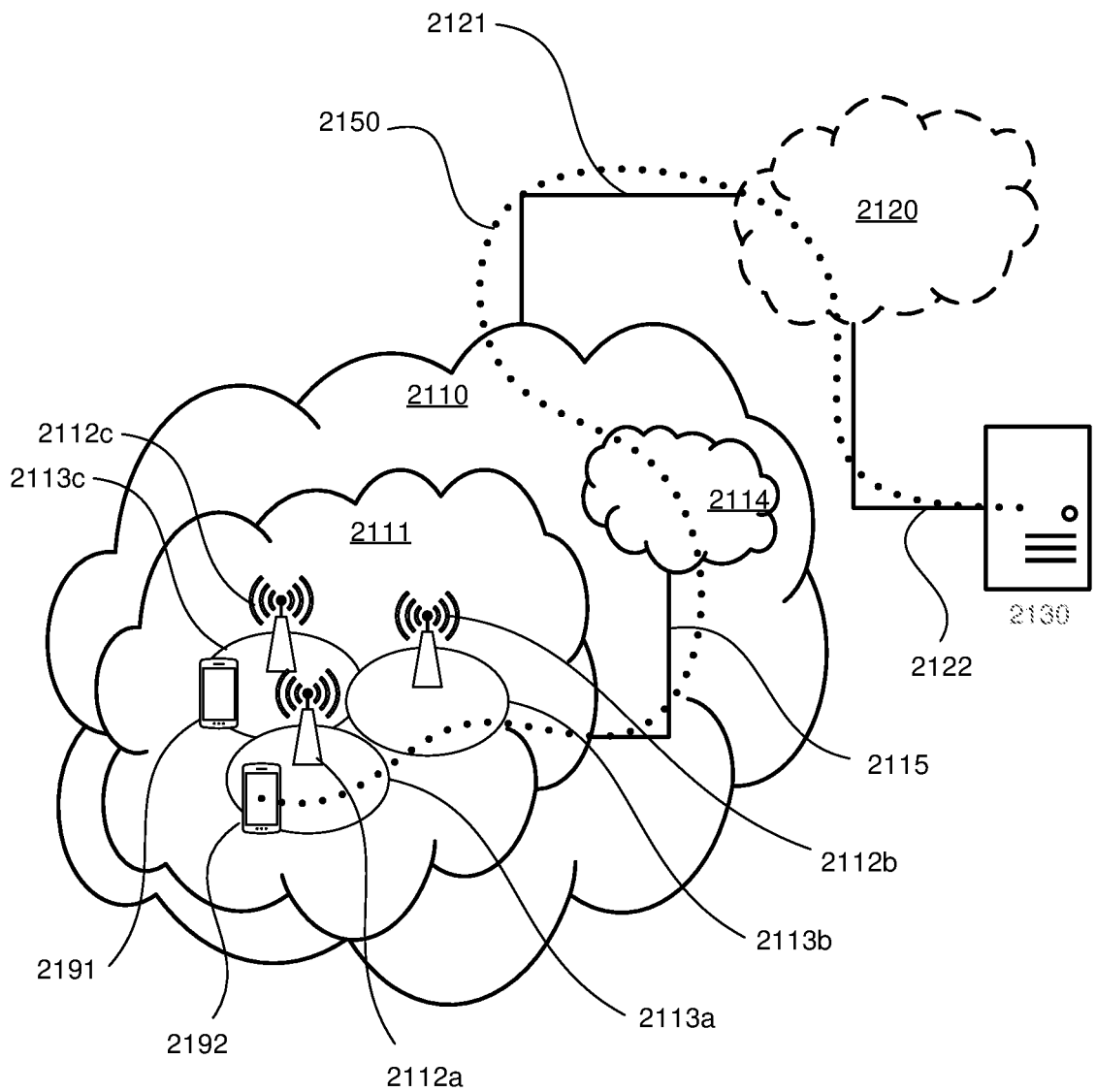
FIG. 21 illustrates an example telecommunication network connected via an intermediate network to a host computer.

With reference to FIG. 21, in accordance with an embodiment, a communication system includes telecommunication network 2110, such as a 3GPP-type cellular network, which comprises access network 2111, such as a radio access network, and core network 2114. Access network 2111 comprises a plurality of base stations 2112a, 2112b, 2112c, such as NBs, eNBs, gNBs or other types of wireless access points, each defining a corresponding coverage area 2113a, 2113b, 2113c. Each base station 2112a, 2112b, 2112c is connectable to core network 2114 over a wired or wireless connection 2115. A first UE 2191 located in coverage area 2113c is configured to wirelessly connect to, or be paged by, the corresponding base station 2112c. A second UE 2192 in coverage area 2113a is wirelessly connectable to the corresponding base station 2112a. While a plurality of UEs 2191, 2192 are illustrated in this example, the disclosed embodiments are equally applicable to a situation where a sole UE is in the coverage area or where a sole UE is connecting to the corresponding base station 2112.

Telecommunication network 2110 is itself connected to host computer 2130, which may be embodied in the hardware and/or software of a standalone server, a cloud-implemented server, a distributed server or as processing resources in a server farm. Host computer 2130 may be under the ownership or control of a service provider, or may be operated by the service provider or on behalf of the service provider. Connections 2121 and 2122 between telecommunication network 2110 and host computer 2130 may extend directly from core network 2114 to host computer 2130 or may go via an optional intermediate network 2120. Intermediate network 2120 may be one of, or a combination of more than one of, a public, private or hosted network; intermediate network 2120, if any, may be a backbone network or the Internet; in particular, intermediate network 2120 may comprise two or more sub-networks (not shown).

The communication system of FIG. 21 as a whole enables connectivity between the connected UEs 2191, 2192 and host computer 2130. The connectivity may be described as an over-the-top (OTT) connection 2150. Host computer 2130 and the connected UEs 2191, 2192 are configured to communicate data and/or signaling via OTT connection 2150, using access network 2111, core network 2114, any intermediate network 2120 and possible further infrastructure (not shown) as intermediaries. OTT connection 2150 may be transparent in the sense that the participating communication devices through which OTT connection 2150 passes are unaware of routing of uplink and downlink communications. For example, base station 2112 may not or need not be informed about the past routing of an incoming downlink communication with data originating from host computer 2130 to be forwarded (e.g., handed over) to a connected UE 2191. Similarly, base station 2112 need not be aware of the future routing of an outgoing uplink communication originating from the UE 2191 towards the host computer 2130.

Example implementations, in accordance with an embodiment, of the UE, base station and host computer discussed in the preceding paragraphs will now be described with reference to FIG. 22. In communication system 2200, host computer 2210 comprises hardware 2215 including communication interface 2216 configured to set up and maintain a wired or wireless connection with an interface of a different communication device of communication system 2200. Host computer 2210 further comprises processing circuitry 2218, which may have storage and/or processing capabilities. In particular, processing circuitry 2218 may comprise one or more programmable processors, application-specific integrated circuits, field programmable gate arrays or combinations of these (not shown) adapted to execute instructions. Host computer 2210 further comprises software 2211, which is stored in or accessible by host computer 2210 and executable by processing circuitry 2218. Software 2211 includes host application 2212. Host application 2212 may be operable to provide a service to a remote user, such as UE 2230 connecting via OTT connection 2250 terminating at UE 2230 and host computer 2210. In providing the service to the remote user, host application 2212 may provide user data which is transmitted using OTT connection 2250.

Communication system 2200 further includes base station 2220 provided in a telecommunication system and comprising hardware 2225 enabling it to communicate with host computer 2210 and with UE 2230. Hardware 2225 may include communication interface 2226 for setting up and maintaining a wired or wireless connection with an interface of a different communication device of communication system 2200, as well as radio interface 2227 for setting up and maintaining at least wireless connection 2270 with UE 2230 located in a coverage area (not shown in FIG. 22) served by base station 2220. Communication interface 2226 may be configured to facilitate connection 2260 to host computer 2210. Connection 2260 may be direct, or it may pass through a core network (not shown in FIG. 22) of the telecommunication system and/or through one or more intermediate networks outside the telecommunication system. In the embodiment shown, hardware 2225 of base station 2220 further includes processing circuitry 2228, which may comprise one or more programmable processors, application-specific integrated circuits, field programmable gate arrays or combinations of these (not shown) adapted to execute instructions. Base station 2220 further has software 2221 stored internally or accessible via an external connection.

Communication system 2200 further includes UE 2230 already referred to. Its hardware 2235 may include radio interface 2237 configured to set up and maintain wireless connection 2270 with a base station serving a coverage area in which UE 2230 is currently located. Hardware 2235 of UE 2230 further includes processing circuitry 2238, which may comprise one or more programmable processors, application-specific integrated circuits, field programmable gate arrays or combinations of these (not shown) adapted to execute instructions. UE 2230 further comprises software 2231, which is stored in or accessible by UE 2230 and executable by processing circuitry 2238. Software 2231 includes client application 2232. Client application 2232 may be operable to provide a service to a human or non-human user via UE 2230, with the support of host computer 2210. In host computer 2210, an executing host application 2212 may communicate with the executing client application 2232 via OTT connection 2250 terminating at UE 2230 and host computer 2210. In providing the service to the user, client application 2232 may receive request data from host application 2212 and provide user data in response to the request data. OTT connection 2250 may transfer both the request data and the user data. Client application 2232 may interact with the user to generate the user data that it provides.

Figure 22:
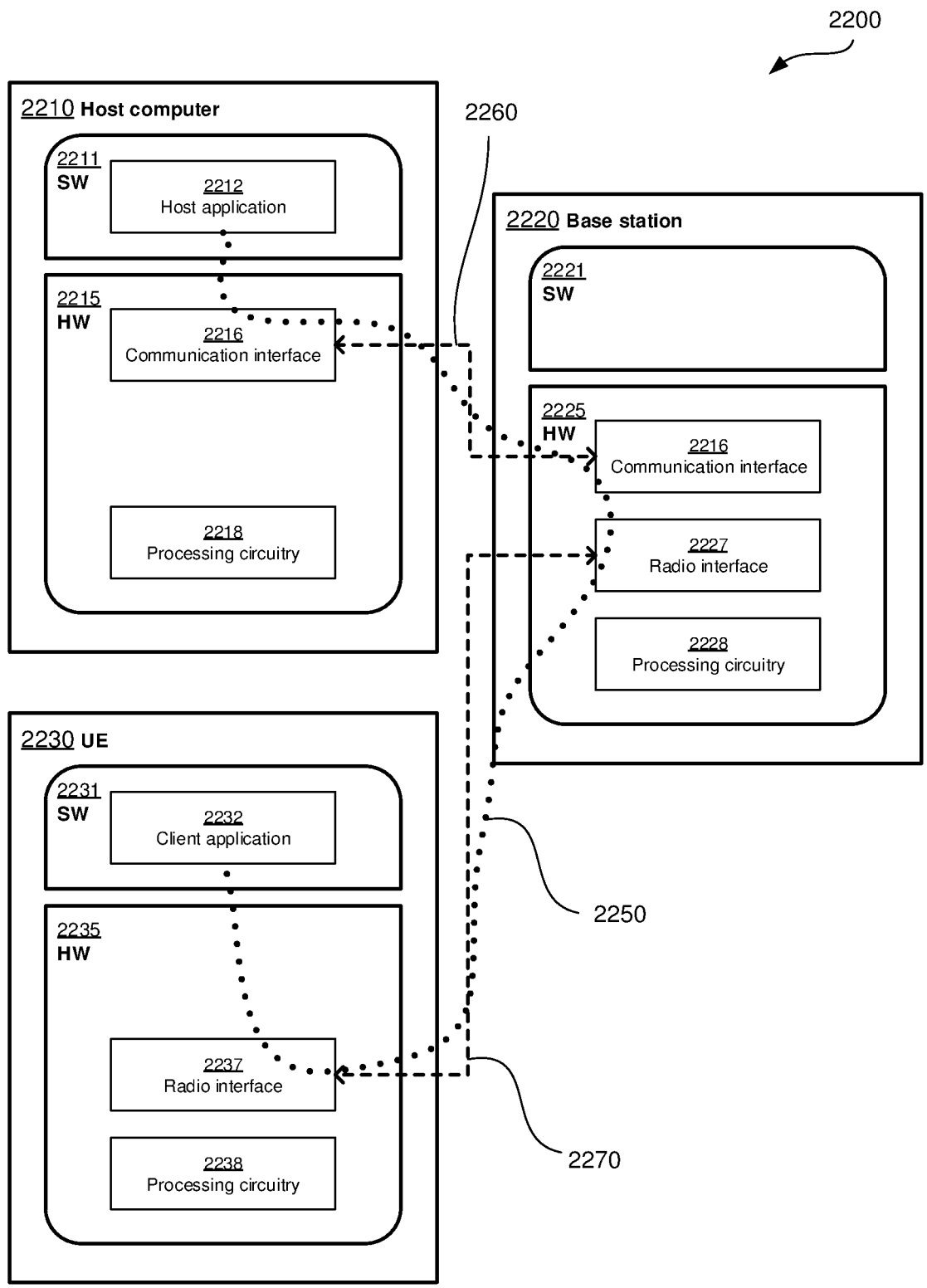
FIG. 22 shows a host computer communicating via a base station with a user equipment over a partially wireless connection according to an embodiment.

It is noted that host computer 2210, base station 2220 and UE 2230 illustrated in FIG. 22 may be similar or identical to host computer 2130, one of base stations 2112*a*, 2112*b*, 2112*c* and one of UEs 2191, 2192 of FIG. 21, respectively. This is to say, the inner workings of these entities may be as shown in FIG. 22 and independently, the surrounding network topology may be that of FIG. 21.

In FIG. 22, OTT connection 2250 has been drawn abstractly to illustrate the communication between host computer 2210 and UE 2230 via base station 2220, without explicit reference to any intermediary devices and the precise routing of messages via these devices. Network infrastructure may determine the routing, which it may be configured to hide from UE 2230 or from the service provider operating host computer 2210, or both. While OTT connection 2250 is active, the network infrastructure may further take decisions by which it dynamically changes the routing (e.g., on the basis of load balancing consideration or reconfiguration of the network).

Wireless connection 2270 between UE 2230 and base station 2220 is in accordance with the teachings of the embodiments described throughout this disclosure. One or more of the various embodiments improve the performance of OTT services provided to UE 2230 using OTT connection 2250, in which wireless connection 2270 forms the last segment. More precisely, the teachings of these embodiments may improve the latency and thereby provide benefits such as better responsiveness.

A measurement procedure may be provided for the purpose of monitoring data rate, latency and other factors on which the one or more embodiments improve. There may further be an optional network functionality for reconfiguring OTT connection 2250 between host computer 2210 and UE 2230, in response to variations in the measurement results. The measurement procedure and/or the network functionality for reconfiguring OTT connection 2250 may be implemented in software 2211 and hardware 2215 of host computer 2210 or in software 2231 and hardware 2235 of UE 2230, or both. In embodiments, sensors (not shown) may be deployed in or in association with communication devices through which OTT connection 2250 passes; the sensors may participate in the measurement procedure by supplying values of the monitored quantities exemplified above, or supplying values of other physical quantities from which software 2211, 2231 may compute or estimate the monitored quantities. The reconfiguring of OTT connection 2250 may include message format, retransmission settings, preferred routing etc.; the reconfiguring need not affect base station 2220, and it may be unknown or imperceptible to base station 2220. Such procedures and functionalities may be known and practiced in the art. In certain embodiments, measurements may involve proprietary UE signaling facilitating host computer 2210's measurements of throughput, propagation times, latency and the like. The measurements may be implemented in that software 2211 and 2231 causes messages to be transmitted, in particular empty or 'dummy' messages, using OTT connection 2250 while it monitors propagation times, errors etc.

Figure 23:
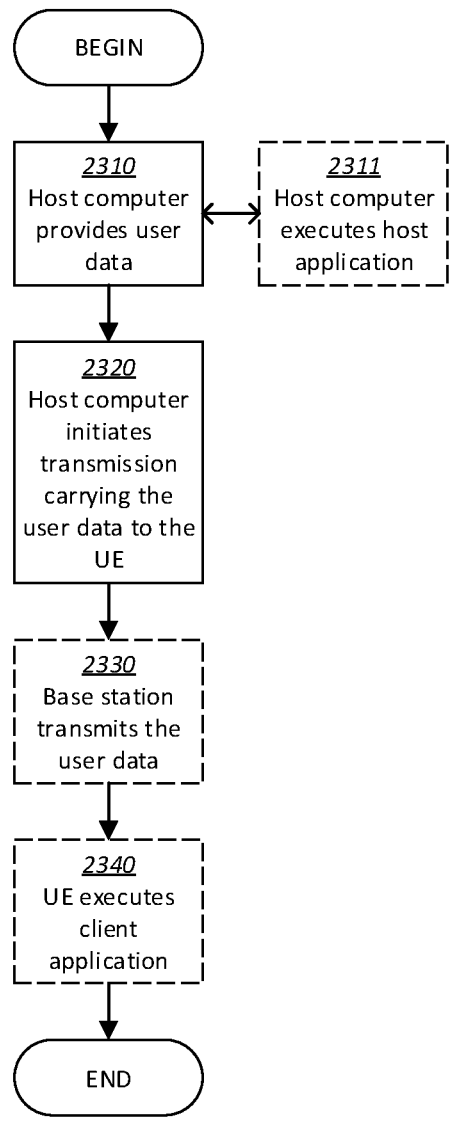
FIG. 23 shows an example method implemented in a communication system including a host computer, a base station and a user equipment.

FIG. 23 is a flowchart illustrating a method implemented in a communication system, in accordance with one embodiment. The communication system includes a host computer, a base station and a UE which may be those described with reference to FIGS. 21 and 22. For simplicity of the present disclosure, only drawing references to FIG. 23 will be included in this section. In step 2310, the host computer provides user data. In substep 2311 (which may be optional) of step 2310, the host computer provides the user data by executing a host application. In step 2320, the host computer initiates a transmission carrying the user data to the UE. In step 2330 (which may be optional), the base station transmits to the UE the user data which was carried in the transmission that the host computer initiated, in accordance with the teachings of the embodiments described throughout this disclosure. In step 2340 (which may also be optional), the UE executes a client application associated with the host application executed by the host computer.

Figure 24:
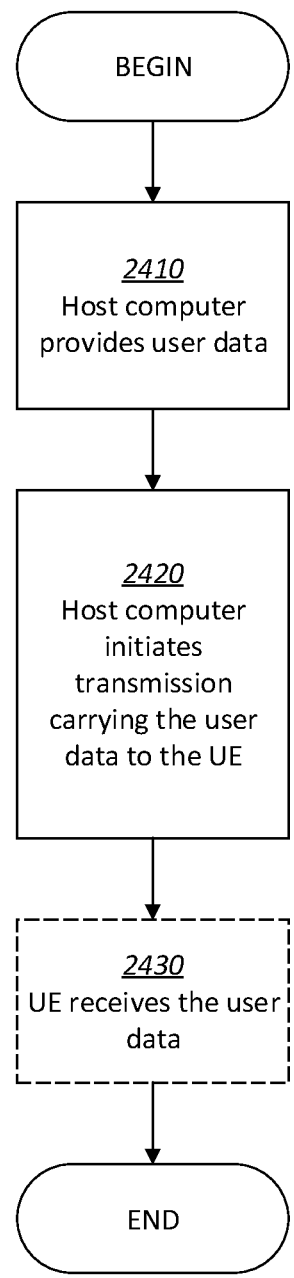
FIG. 24 illustrates an example method implemented in a communication system including a host computer, a base station and a user equipment.

FIG. 24 is a flowchart illustrating a method implemented in a communication system, in accordance with one embodiment. The communication system includes a host computer, a base station and a UE which may be those described with reference to FIGS. 21 and 22. For simplicity of the present disclosure, only drawing references to FIG. 24 will be included in this section. In step 2410 of the method, the host computer provides user data. In an optional substep (not shown) the host computer provides the user data by executing a host application. In step 2420, the host computer initiates a transmission carrying the user data to the UE. The transmission may pass via the base station, in accordance with the teachings of the embodiments described throughout this disclosure. In step 2430 (which may be optional), the UE receives the user data carried in the transmission.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Numbered Embodiments in Particular Related to FIGS. 18-24

Group A Embodiments

1. A method performed by a wireless device for receiving data in a cell-free massive Multiple-Input and Multiple-Output, MIMO, communications system, the method comprising:
   receiving said data.
2. The method of the previous embodiment, further comprising:
   providing user data; and
   forwarding the user data to a host computer via the transmission to the base station.

Group B Embodiments

3. A method performed by a base station for transmitting data intended for a terminal in a cell-free massive Multiple-Input and Multiple-Output, MIMO, communications system, wherein the base station is connected to, and manages, a cluster of Access Points, APs, and the cluster operates autonomously, wherein the method comprising: the method comprising:
   transmitting, to all APs in the cluster, a message that the receiving APs are selected to serve the terminal and said data intended for the terminal.
4. The method of embodiment 3, wherein the method further comprises:
   receiving, from an AP within the cluster, a message that said AP can serve the terminal; and
   identifying all APs in the cluster that the base station manages.
5. The method of any of the previous embodiments, further comprising:
   obtaining user data; and
   forwarding the user data to a host computer or a wireless device.

Group C Embodiments

6. A wireless device for receiving data in a cell-free massive Multiple-Input and Multiple-Output, MIMO, communications system, the wireless device comprising:

processing circuitry configured to perform any of the steps of any of the Group A embodiments; and
power supply circuitry configured to supply power to the wireless device.
7. A base station for transmitting data intended for a terminal in a cell-free massive Multiple-Input and Multiple-Output, MIMO, communications system, the base station comprising:
processing circuitry configured to perform any of the steps of any of the Group B embodiments;
power supply circuitry configured to supply power to the wireless device.
8. A user equipment (UE) for receiving data in a cell-free massive Multiple-Input and Multiple-Output, MIMO, communications system, the UE comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.
9. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps of any of the Group B embodiments.
10. The communication system of the pervious embodiment further including the base station.
11. The communication system of the previous 2 embodiments, further including the UE, wherein the UE is configured to communicate with the base station.
12. The communication system of the previous 3 embodiments, wherein:
the processing circuitry of the host computer is configured to execute a host application, thereby providing the user data; and
the UE comprises processing circuitry configured to execute a client application associated with the host application.
13. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps of any of the Group B embodiments.
14. The method of the previous embodiment, further comprising, at the base station, transmitting the user data.
15. The method of the previous 2 embodiments, wherein the user data is provided at the host computer by executing a host application, the method further comprising, at the UE, executing a client application associated with the host application.
16. A user equipment (UE) configured to communicate with a base station, the UE comprising a radio interface and processing circuitry configured to performs the of the previous 3 embodiments.
17. A communication system including a host computer comprising:
processing circuitry configured to provide user data; and
a communication interface configured to forward user data to a cellular network for transmission to a user equipment (UE),
wherein the UE comprises a radio interface and processing circuitry, 5 the UE's components configured to perform any of the steps of any of the Group A embodiments.
18. The communication system of the previous embodiment, wherein the cellular network further includes a base station configured to communicate with the UE.
19. The communication system of the previous 2 embodiments, wherein:
the processing circuitry of the host computer is configured to execute a host application, thereby providing the user data; and
the UE's processing circuitry is configured to execute a client application associated with the host application.
20. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the steps of any of the Group A embodiments.
21. The method of the previous embodiment, further comprising at the UE, receiving the user data from the base station.
22. A communication system including a host computer comprising:
communication interface configured to receive user data originating from a transmission from a user equipment (UE) to a base station,
wherein the UE comprises a radio interface and processing circuitry, the UE's processing circuitry configured to perform any of the steps of any of the Group A embodiments.
23. The communication system of the previous embodiment, further including the UE.
24. The communication system of the previous 2 embodiments, further including the base station, wherein the base station comprises a radio interface configured to communicate with the UE and a communication interface configured to forward to the host 5 computer the user data carried by transmission from the UE to the base station.
25. The communication system of the previous 3 embodiments, wherein:

the processing circuitry of the host computer is configured to execute a host application; and
the UE's processing circuitry is configured to execute a client application associated with the host application, thereby providing the user data.

26. The communication system of the previous 4 embodiments, wherein:
the processing circuitry of the host computer is configured to execute a host application, thereby providing request data; and
the UE's processing circuitry is configured to execute a client application associated with the host application, thereby providing the user data in response to the request data.

27. A method implemented in a communication system including a host computer, a base station and a user equipment (UE), the method comprising:
at the host computer, receiving user data transmitted to the base station from the UE, wherein the UE performs any of the steps of any of the Group A embodiments.

28. The method of the previous embodiment, further comprising, at the UE, providing the user data to the base station.

29. The method of the previous 2 embodiments, further comprising:
at the UE, executing a client application, thereby providing the user data to be transmitted; and
at the host computer, executing a host application associated with the client application.

30. The method of the previous 3 embodiments, further comprising:
at the UE, executing a client application; and
at the UE, receiving input data to the client application, the input data being provided at the host computer by executing a host application associated with the client application,
wherein the user data to be transmitted is provided by the client application in response to the input data.

31. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

32. The communication system of the previous embodiment further including the base station.

33. The communication system of the previous 2 embodiments, further including the UE, wherein the UE is configured to communicate with the base station.

34. The communication system of the previous 3 embodiments, wherein:
the processing circuitry of the host computer is configured to execute a host application;
the UE is configured to execute a client application associated with the host application, thereby providing the user data to be received by the host computer.

35. A method implemented in a communication system including a host computer, a base station and a user equipment (UE), the method comprising:
at the host computer, receiving, from the base station, user data originating from a transmission which the base station has received from the UE, wherein the UE performs any of the steps of any of the Group A embodiments.

36. The method of the previous embodiment, further comprising at the base station, receiving the user data from the UE.

37. The method of the previous 2 embodiments, further comprising at the base station, initiating a transmission of the received user data to the host computer.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood. It will be further understood that terms used herein should be interpreted as having a meaning that is consistent with their meaning in the context of this specification and the relevant art and will not be interpreted in an idealized or overly formal sense unless expressly so defined herein.

Modifications and other variants of the described embodiments will come to mind to one skilled in the art having benefit of the teachings presented in the foregoing description and associated drawings. Therefore, it is to be understood that the embodiments are not limited to the specific example embodiments described in this disclosure and that modifications and other variants are intended to be included within the scope of this disclosure. Furthermore, although specific terms may be employed herein, they are used in a generic and descriptive sense only and not for purposes of limitation. Therefore, a person skilled in the art would recognize numerous variations to the described embodiments that would still fall within the scope of the present disclosure. As used herein, the terms "comprise/comprises" or "include/includes" do not exclude the presence of other elements or steps. Furthermore, although individual features may be included in different embodiments, these may possibly advantageously be combined, and the inclusion of different embodiments does not imply that a combination of features is not feasible and/or advantageous. In addition, singular references do not exclude a plurality.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).
AP Access Point
CPU Central Process Unit
UE User Equipment
1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component CCCH SDU Common Control Channel SDU
CDMA Code Division Multiplexing Access
CCI Cell Global identifier
CR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast. Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ indicator Channel
PLMN Public Land Mobile Network
PMI Precoder Matrix indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division

The invention claimed is:

1. A method implemented in an Access Point, AP, for transmitting data intended for a terminal in a cell-free massive Multiple-Input and Multiple-Output, MIMO, communications system, the AP being grouped into a cluster together with other APs and the cluster operates autonomously, and the cluster being connected to, and managed by, one Central Processing Unit, CPU, the method comprising:
  receiving, from the CPU, a message that the AP is selected to serve the terminal and data intended for said terminal;
  independently conducting power control, exclusively considering terminals that are served by the AP itself, conducting power control comprising calculating a power control coefficient ($\eta$) for use with the terminal, the power control coefficient ($\eta$) is calculated by a normalized function $f(\bullet)$ of at least one parameter of the communications system, the function $f(\bullet)$ is normalized to ensure that a power constraint of the AP is fulfilled, and the function $f(\bullet)$ is a function $f(\bullet)$ of variance of an estimated channel ($\gamma$) between the AP and the terminal; and
  transmitting said intended data to the terminal.

2. The method according to claim 1, wherein the method further comprises:
  receiving an uplink pilot from the terminal; and
  estimating uplink channel condition from said uplink pilot.

3. The method according to claim 1, wherein the method further comprises:

determining, based on a metric related to a relation between the AP and the terminal, that the AP can serve the terminal; and transmitting a message to the CPU that the AP can serve the terminal.

4. The method according to claim 3, wherein the metric is channel condition and wherein determining that the AP can serve the terminal is based on the channel condition estimated by the AP from uplink pilots received from the terminal.

5. The method according to claim 1, wherein the normalized function $f(\bullet)$ is a function $f(\bullet)$ of one or more local parameters of the communications system.

6. The method according to claim 1, wherein the function $f(\bullet)$ is a function $f(\bullet)$ of variances of estimated channels ($\gamma$) between the AP and at least a subset of terminals served by the AP.

7. An Access Point, AP, configured to transmit data intended for a terminal in a cell-free massive Multiple-Input and Multiple-Output, MIMO, communications system, the AP being grouped into a cluster together with other APs and the cluster operates autonomously and the cluster being connected to, and managed by, one Central Processing Unit, CPU, the AP comprises:

a processing circuitry; and a memory circuitry storing computer program code which, when run in the processing circuitry, causes the AP to:

receive, from the CPU, a message that the AP is selected to serve the terminal and data intended for said terminal;

independently conduct power control, exclusively considering terminals that are served by the AP itself, the power control being conducted by calculating a power control coefficient ($\eta$) for use with the terminal, the power control coefficient ($\eta$) is calculated by a normalized function $f(\bullet)$ of at least one parameter of the communications system, the function $f(\bullet)$ is normalized to ensure that a power constraint of the AP is fulfilled and the function $f(\bullet)$ is a function $f(\bullet)$ of variance of an estimated channel ($\gamma$) between the AP and the terminal; and transmit said intended data to the terminal.

8. The AP according to claim 7, wherein the memory circuitry storing computer program code which, when run in the processing circuitry, further causes the AP to:

receive an uplink pilot from the terminal; and estimate uplink channel condition from said uplink pilot.

9. The AP according to claim 7, wherein the memory circuitry storing computer program code which, when run in the processing circuitry, causes the AP to:

determine, based on a metric related to a relation between the AP and the terminal, that the AP can serve the terminal; and transmit a message to the CPU that the AP can serve the terminal.

10. The AP according to claim 9, wherein the metric is channel condition and the memory circuitry storing computer program code which, when run in the processing circuitry, causes the AP to determine that the AP can serve the terminal based on the channel condition estimated by the AP from uplink pilots received from the terminal.

11. The AP according to claim 7, wherein the normalized function $f(\bullet)$ is a function $f(\bullet)$ of one or more local parameters of the communications system.

12. The AP according to claim 7, wherein the function $f(\bullet)$ is a function $f(\bullet)$ of variances of estimated channels ($\gamma$) between the AP and at least a subset of terminals served by the AP.

13. A method, implemented in a Central Processing Unit, CPU, for transmitting data intended for a terminal in a cell-free massive Multiple-Input and Multiple-Output, MIMO, communications system, the CPU being connected to, and managing, a cluster of Access Points, APs, and the cluster operates autonomously, the method comprising:

independently conducting power control, exclusively considering terminals that are served by each AP, conducting power control comprising calculating a power control coefficient ($\eta$) for use with the terminal, the power control coefficient ($\eta$) is calculated by a normalized function $f(\bullet)$ of at least one parameter of the communications system, the function $f(\bullet)$ is normalized to ensure that a power constraint of each AP is fulfilled, and the function $f(\bullet)$ is a function $f(\bullet)$ of variance of an estimated channel ($\gamma$) between each AP and the terminal; and transmitting, to all APs in the cluster, a message that the receiving APs are selected to serve the terminal and said data intended for the terminal.

14. The method according to claim 13, wherein the method further comprises:

receiving, from an AP within the cluster, a message that said AP can serve the terminal; and identifying all APs in the cluster that the CPU manages.

15. A Central Processing Unit, CPU, configured to transmit data intended for a terminal in a cell-free massive Multiple-Input and Multiple-Output, MIMO, communications system, the CPU being connected to, and managing, a cluster of Access Points, APs, and the cluster operates autonomously, the CPU comprising:

a processing circuitry; and a memory circuitry storing computer program code which, when run in the processing circuitry, causes the CPU to:

independently conduct power control, exclusively considering terminals that are served by each AP, each AP being caused to conduct power control by calculating a power control coefficient ($\eta$) for use with the terminal, the power control coefficient ($\eta$) is calculated by a normalized function $f(\bullet)$ of at least one parameter of the communications system, the function $f(\bullet)$ is normalized to ensure that a power constraint of each AP is fulfilled, and the function $f(\bullet)$ is a function $f(\bullet)$ of variance of an estimated channel ($\gamma$) between each AP and the terminal; and transmit, to all APs in the cluster, a message that the receiving APs are selected to serve the terminal and said data intended for the terminal.

16. The CPU according to claim 15, wherein the memory circuitry storing computer program code which, when run in the processing circuitry, further causes the CPU to:

receive, from an AP within the cluster, a message that said AP can serve the terminal; and identify all APs in the cluster that the CPU manages.

* * * * *